US012439846B2

(12) United States Patent
Cholst et al.

(10) Patent No.: US 12,439,846 B2
(45) Date of Patent: Oct. 14, 2025

(54) STRING TRIMMER HEAD

(71) Applicant: MILWAUKEE ELECTRIC TOOL CORPORATION, Brookfield, WI (US)

(72) Inventors: Beth E. Cholst, Wauwatosa, WI (US); Troy C. Thorson, Cedarburg, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 474 days.

(21) Appl. No.: 17/723,146

(22) Filed: Apr. 18, 2022

(65) Prior Publication Data

US 2022/0330479 A1  Oct. 20, 2022

Related U.S. Application Data

(60) Provisional application No. 63/241,200, filed on Sep. 7, 2021, provisional application No. 63/213,410, filed on Jun. 22, 2021, provisional application No. 63/176,636, filed on Apr. 19, 2021.

(51) Int. Cl.
A01D 34/416 (2006.01)

(52) U.S. Cl.
CPC ..... *A01D 34/4168* (2013.01); *A01D 34/4165* (2013.01)

(58) Field of Classification Search
CPC .............. A01D 34/416; A01D 34/4161; A01D 34/4168; A01D 34/4165
USPC .......................................................... 30/276
See application file for complete search history.

(56) References Cited

U.S. PATENT DOCUMENTS

| 1,688,914 | A | 10/1928 | Ariens |
| 1,911,623 | A | 5/1933 | Karl |
| 2,020,524 | A | 11/1935 | Smithburn |
| 2,022,335 | A | 11/1935 | Bernthal |
| 2,131,324 | A | 9/1938 | Hull |
| 2,188,644 | A | 1/1940 | Short |
| D130,494 | S | 11/1941 | Schmeiser |
| 2,290,575 | A | 7/1942 | Potter |
| D137,446 | S | 3/1944 | Schmeiser |
| D138,712 | S | 9/1944 | Karl |
| 2,366,624 | A | 1/1945 | Kelsey |
| 2,366,625 | A | 1/1945 | Kelsey |
| 2,388,553 | A | 11/1945 | Kraus |

(Continued)

FOREIGN PATENT DOCUMENTS

| CN | 2862622 Y | 1/2007 |
| CN | 100396170 C | 6/2008 |

(Continued)

OTHER PUBLICATIONS

Ego, "Power+ 9.5" Cultivator Attachment, <https://egopowerplus.com/multi-head-cultivator-attachment/> web page visited May 2, 2022.

(Continued)

*Primary Examiner* — Jennifer S Matthews
(74) *Attorney, Agent, or Firm* — Dority & Manning, P.A.

(57) ABSTRACT

A trimmer head includes a housing rotatable about a rotational axis. The housing includes a main body defining a cavity, and a cap removably coupled to the main body. The trimmer head additionally includes a spool supported in the cavity and operable to support line to be dispensed, a retainer positioned between the housing and the spool, and a first ring protruding from a distal end of the housing.

10 Claims, 21 Drawing Sheets

(56) References Cited

U.S. PATENT DOCUMENTS

| | | | |
|---|---|---|---|
| 2,430,148 A | 11/1947 | Traver |
| 2,438,707 A | 3/1948 | Kropp |
| 2,455,147 A | 11/1948 | Traver |
| 2,455,148 A | 11/1948 | Traver |
| 2,491,892 A | 12/1949 | Claus |
| 2,501,364 A | 3/1950 | Traver |
| 2,551,132 A | 5/1951 | Jacobus |
| 2,560,359 A | 7/1951 | McCardell |
| 2,575,223 A | 11/1951 | Madill |
| 2,593,065 A | 4/1952 | Simon |
| 2,595,537 A | 5/1952 | Elmer |
| 2,603,139 A | 7/1952 | Johnson |
| 2,614,375 A | 10/1952 | Calkins |
| 2,614,474 A | 10/1952 | Merry |
| 2,634,666 A | 4/1953 | Merry |
| 2,679,794 A | 6/1954 | Ober |
| 2,683,406 A | 7/1954 | Kelsey |
| 2,684,022 A | 7/1954 | Smithburn |
| 2,691,933 A | 10/1954 | Emerson |
| 2,748,683 A | 6/1956 | Milan |
| 2,751,833 A | 6/1956 | Glynn |
| 2,762,073 A | 9/1956 | Lombardi |
| 2,796,819 A | 6/1957 | Arvid |
| 2,803,183 A | 8/1957 | Smithburn |
| 2,812,701 A | 11/1957 | Weaver, Jr. |
| 2,816,495 A | 12/1957 | Brooks |
| 2,832,184 A | 4/1958 | Beuerle |
| 2,835,182 A | 5/1958 | Smithburn |
| 2,847,922 A | 8/1958 | Stephenson |
| 2,847,924 A | 8/1958 | Quick |
| 2,888,994 A | 6/1959 | Hoff et al. |
| 2,903,077 A | 9/1959 | Igor |
| 3,151,685 A | 10/1964 | Field |
| 3,173,498 A | 3/1965 | Harold |
| 3,203,487 A | 8/1965 | Whitesides |
| 3,212,585 A | 10/1965 | Bezzerides |
| 3,213,514 A | 10/1965 | James |
| 3,233,685 A | 2/1966 | Brewer |
| 3,233,686 A | 2/1966 | Steadman |
| 3,306,371 A | 2/1967 | Bush |
| 3,362,482 A | 1/1968 | Riddle |
| 3,375,879 A | 4/1968 | Troyer et al. |
| 3,397,748 A | 8/1968 | Whitesides |
| 3,435,904 A | 4/1969 | Rice |
| 3,442,335 A | 5/1969 | Silbereis et al. |
| D221,461 S | 8/1971 | Hagenstad |
| 3,605,907 A | 9/1971 | Schuring et al. |
| 3,664,102 A | 5/1972 | Reber |
| 3,698,485 A | 10/1972 | Trimpe et al. |
| 3,702,638 A | 11/1972 | Takata |
| D225,551 S | 12/1972 | Moore |
| D225,553 S | 12/1972 | Moore |
| 3,734,201 A | 5/1973 | Zaun |
| 3,755,845 A | 9/1973 | Coult |
| 3,760,884 A | 9/1973 | Webster et al. |
| 3,781,991 A | 1/1974 | Stretton et al. |
| 3,868,741 A | 3/1975 | Coult |
| 3,892,278 A | 7/1975 | Smith et al. |
| 4,006,528 A | 2/1977 | Katsuya |
| 4,007,525 A | 2/1977 | Utter |
| 4,043,399 A | 8/1977 | Morrison |
| 4,043,404 A | 8/1977 | Sorlie et al. |
| 4,044,841 A | 8/1977 | Smith et al. |
| 4,047,299 A | 9/1977 | Bair |
| 4,047,576 A | 9/1977 | Rau et al. |
| 4,049,059 A | 9/1977 | Weibling |
| 4,062,408 A | 12/1977 | Enters et al. |
| 4,068,377 A | 1/1978 | Kimmel et al. |
| D247,567 S | 3/1978 | Haataja |
| 4,094,363 A | 6/1978 | McCoomb |
| 4,095,338 A | 6/1978 | Naohiko et al. |
| 4,097,991 A | 7/1978 | Proulx |
| 4,098,349 A | 7/1978 | Jilani |
| 4,100,971 A | 7/1978 | Honnold |
| 4,113,027 A | 9/1978 | Van Der |
| 4,118,132 A | 10/1978 | Dobberpuhl |
| 4,133,390 A | 1/1979 | Reaume |
| 4,151,646 A | 5/1979 | Lane |
| 4,151,883 A | 5/1979 | Van Der et al. |
| 4,161,820 A | 7/1979 | Moore |
| 4,167,812 A | 9/1979 | Moore |
| 4,168,572 A | 9/1979 | Ewing |
| 4,169,311 A * | 10/1979 | Evenson ............ A01D 34/4161 30/276 |
| 4,183,138 A | 1/1980 | Mitchell et al. |
| 4,189,830 A | 2/1980 | Pittinger, Jr. |
| 4,189,833 A | 2/1980 | Kwater |
| 4,195,408 A | 4/1980 | Palmieri et al. |
| 4,214,632 A | 7/1980 | Brookshier |
| 4,236,311 A | 12/1980 | Mitchell |
| 4,237,610 A | 12/1980 | Bradus et al. |
| 4,250,621 A | 2/1981 | Houle |
| 4,250,622 A | 2/1981 | Houle |
| 4,253,238 A | 3/1981 | Sheldon |
| 4,256,183 A | 3/1981 | Hanley |
| 4,258,635 A | 3/1981 | Lutz et al. |
| 4,267,891 A | 5/1981 | Van Der et al. |
| 4,269,372 A | 5/1981 | Kwater |
| 4,271,595 A | 6/1981 | Rahe |
| 4,274,201 A | 6/1981 | Oberg et al. |
| 4,276,940 A | 7/1981 | Kirkegaard |
| 4,278,133 A | 7/1981 | De Marcellus |
| 4,290,488 A | 9/1981 | Pelsy |
| 4,307,479 A | 12/1981 | Mertes et al. |
| 4,346,764 A | 8/1982 | Rossi |
| 4,349,962 A | 9/1982 | Itagaki et al. |
| 4,362,074 A | 12/1982 | Kwater |
| 4,364,437 A | 12/1982 | Haapala |
| 4,372,397 A | 2/1983 | Goertzen et al. |
| 4,373,590 A | 2/1983 | Wittrock |
| 4,398,606 A | 8/1983 | Herscher |
| 4,398,608 A | 8/1983 | Boetto |
| 4,402,365 A | 9/1983 | Goertzen |
| 4,411,322 A | 10/1983 | Linger |
| 4,412,382 A | 11/1983 | White, III |
| 4,412,588 A | 11/1983 | Van Der et al. |
| 4,415,041 A | 11/1983 | Fackler |
| 4,421,176 A | 12/1983 | Tuggle et al. |
| 4,421,178 A | 12/1983 | Vandelli et al. |
| 4,424,869 A | 1/1984 | Vom Braucke et al. |
| 4,426,780 A | 1/1984 | Foster |
| 4,458,419 A | 7/1984 | Proulx |
| 4,467,874 A | 8/1984 | Wittrock |
| 4,490,910 A | 1/1985 | Mattson et al. |
| 4,492,271 A | 1/1985 | Doering |
| 4,515,222 A | 5/1985 | Van Der |
| 4,524,515 A | 6/1985 | Oberg |
| 4,561,180 A | 12/1985 | Pittinger, Sr. et al. |
| 4,611,669 A | 9/1986 | Ballard |
| 4,629,007 A | 12/1986 | Pegoraro |
| 4,633,588 A | 1/1987 | Pittinger, Jr. |
| 4,646,850 A | 3/1987 | Brown et al. |
| 4,656,739 A | 4/1987 | Pittinger, Jr. |
| 4,658,910 A | 4/1987 | Garriss |
| 4,660,286 A | 4/1987 | Engelbrecht et al. |
| 4,672,798 A | 6/1987 | Ota |
| 4,678,043 A | 7/1987 | Vom Braucke et al. |
| 4,702,005 A | 10/1987 | Pittinger, Sr. et al. |
| 4,706,761 A | 11/1987 | Herscher et al. |
| D293,342 S | 12/1987 | Thomson et al. |
| 4,736,573 A | 4/1988 | Seck et al. |
| 4,744,148 A | 5/1988 | Brown |
| 4,776,290 A | 10/1988 | Rau et al. |
| 4,776,405 A | 10/1988 | Grieder et al. |
| D300,141 S | 3/1989 | Kawashima |
| 4,817,732 A | 4/1989 | Brown |
| 4,871,031 A | 10/1989 | Kestel |
| 4,882,843 A | 11/1989 | Baba |
| 4,888,871 A | 12/1989 | Engelbrecht |
| 4,942,664 A | 7/1990 | Zatulovsky |
| 5,010,720 A | 4/1991 | Corsi |
| 5,025,615 A | 6/1991 | Hawkenson |
| 5,029,361 A | 7/1991 | Murata et al. |
| 5,033,259 A | 7/1991 | Adcock |

(56) References Cited

U.S. PATENT DOCUMENTS

| | | |
|---|---|---|
| 5,048,616 A | 9/1991 | Hoff, deceased |
| 5,056,181 A | 10/1991 | Tsuchiya et al. |
| 5,063,673 A | 11/1991 | Webster |
| 5,063,731 A | 11/1991 | Hull et al. |
| 5,082,063 A | 1/1992 | Sidders |
| 5,109,976 A | 5/1992 | Mohri et al. |
| 5,136,782 A | 8/1992 | Calcinai |
| 5,148,569 A | 9/1992 | Jailor et al. |
| 5,158,145 A | 10/1992 | Karchewski |
| 5,159,845 A | 11/1992 | Wada et al. |
| 5,224,553 A | 7/1993 | Heintzman |
| 5,267,517 A | 12/1993 | Jones |
| 5,299,647 A | 4/1994 | Mudd et al. |
| 5,339,526 A | 8/1994 | Everts |
| 5,351,565 A | 10/1994 | Wada et al. |
| 5,361,570 A | 11/1994 | Bernardy |
| 5,375,284 A | 12/1994 | Deimel et al. |
| 5,394,612 A | 3/1995 | Wolfington |
| 5,443,023 A | 8/1995 | Carroll |
| 5,507,351 A | 4/1996 | Martin |
| 5,524,349 A | 6/1996 | Dolin |
| 5,645,000 A | 7/1997 | Carroll |
| 5,662,173 A | 9/1997 | Blesing |
| 5,765,287 A | 6/1998 | Griffini et al. |
| 5,806,294 A | 9/1998 | Strieber |
| 5,810,093 A | 9/1998 | Howard |
| 5,850,882 A | 12/1998 | Link |
| 5,855,068 A | 1/1999 | Zilly et al. |
| 5,875,700 A | 3/1999 | Powell |
| 5,931,605 A | 8/1999 | Toor et al. |
| 5,950,317 A | 9/1999 | Yates et al. |
| 5,960,889 A | 10/1999 | Mclaren |
| 5,996,234 A | 12/1999 | Fowler et al. |
| 6,017,169 A | 1/2000 | Toor et al. |
| D421,026 S | 2/2000 | Bruns et al. |
| 6,021,630 A | 2/2000 | Higashi et al. |
| 6,052,976 A | 4/2000 | Cellini et al. |
| 6,065,214 A | 5/2000 | Nagashima |
| 6,167,973 B1 | 1/2001 | Nagashima |
| 6,272,756 B1 | 8/2001 | Peterson et al. |
| 6,293,349 B1 | 9/2001 | Marshall et al. |
| 6,311,398 B1 | 11/2001 | Peterson et al. |
| 6,364,030 B1 | 4/2002 | Pfeiffer et al. |
| 6,367,561 B1 | 4/2002 | Firdaus |
| 6,422,194 B2 | 7/2002 | Ito et al. |
| 6,446,346 B1 | 9/2002 | Castleman |
| D467,944 S | 12/2002 | Stark |
| 6,487,780 B1 | 12/2002 | Peterson et al. |
| 6,488,101 B1 | 12/2002 | Miyahara et al. |
| 6,494,176 B2 | 12/2002 | Ito et al. |
| 6,497,044 B2 | 12/2002 | Yamane et al. |
| D469,447 S | 1/2003 | Stark |
| 6,505,596 B2 | 1/2003 | Ito et al. |
| 6,508,224 B2 | 1/2003 | Ito et al. |
| 6,519,857 B1 | 2/2003 | Proulx et al. |
| 6,523,618 B2 | 2/2003 | Firdaus |
| 6,540,031 B1 | 4/2003 | Sasaoka |
| 6,578,270 B2 | 6/2003 | Hiratsuna et al. |
| 6,594,907 B2 | 7/2003 | Wilson et al. |
| 6,612,376 B2 | 9/2003 | Sergyeyenko et al. |
| 6,640,449 B1 | 11/2003 | Hoffmann et al. |
| 6,644,416 B2 | 11/2003 | Teeple |
| 6,666,009 B1 | 12/2003 | Brandon |
| 6,672,273 B2 | 1/2004 | Ito et al. |
| 6,705,263 B2 | 3/2004 | Ito et al. |
| 6,708,774 B2 | 3/2004 | Miyahara et al. |
| 6,722,041 B2 | 4/2004 | Warashina et al. |
| 6,739,058 B2 | 5/2004 | Warashina et al. |
| 6,739,403 B2 | 5/2004 | Firdaus |
| 6,754,962 B2 | 6/2004 | Warashina et al. |
| 6,754,963 B2 | 6/2004 | Warashina et al. |
| 6,754,964 B2 | 6/2004 | Sugihara et al. |
| 6,757,980 B2 | 7/2004 | Arsenault |
| 6,766,866 B2 | 7/2004 | Miyahara et al. |
| 6,779,274 B2 | 8/2004 | Peterson et al. |
| 6,782,863 B2 | 8/2004 | Leasure et al. |
| 6,810,849 B1 | 11/2004 | Hirsch et al. |
| 6,823,947 B2 | 11/2004 | Nagaoka et al. |
| 6,834,633 B2 | 12/2004 | Sing et al. |
| 6,854,525 B2 | 2/2005 | Martindale |
| D503,938 S | 4/2005 | Vasilescu |
| 6,904,977 B2 | 6/2005 | Zerrer et al. |
| 6,926,090 B2 | 8/2005 | Sergyeyenko et al. |
| 6,926,091 B2 | 8/2005 | Lee |
| 6,938,587 B2 | 9/2005 | Thomas et al. |
| 6,944,954 B1 | 9/2005 | Arnetoli |
| 6,952,877 B2 | 10/2005 | Pfaltzgraff |
| 6,997,812 B2 | 2/2006 | Sasaki et al. |
| 7,000,324 B2 | 2/2006 | Fogle |
| 7,017,272 B2 | 3/2006 | Grace |
| D518,831 S | 4/2006 | Bowsher |
| D519,526 S | 4/2006 | Bowsher |
| D523,028 S | 6/2006 | Fitzpatrick |
| 7,059,106 B2 | 6/2006 | Brandon |
| 7,096,966 B2 | 8/2006 | Eberhardt et al. |
| 7,171,723 B2 | 2/2007 | Kobayashi et al. |
| 7,171,798 B1 | 2/2007 | Bernardy |
| 7,251,857 B2 | 8/2007 | Caruso |
| 7,275,324 B2 | 10/2007 | Proulx |
| 7,302,790 B2 | 12/2007 | Brandon |
| 7,303,025 B2 | 12/2007 | Mayer |
| 7,395,601 B2 | 7/2008 | Berfield |
| 7,412,768 B2 | 8/2008 | Alliss |
| 7,480,998 B2 | 1/2009 | Suzuki et al. |
| 7,484,568 B2 | 2/2009 | Vasilescu |
| 7,513,046 B2 | 4/2009 | Proulx |
| D598,255 S | 8/2009 | Alliss |
| 7,575,066 B2 | 8/2009 | Bauer |
| 7,581,322 B2 | 9/2009 | Proulx |
| 7,594,334 B2 | 9/2009 | Kocha |
| 7,607,232 B2 | 10/2009 | Pfaltzgraff |
| D607,017 S | 12/2009 | Fraley et al. |
| 7,624,814 B2 | 12/2009 | Skolness |
| 7,640,668 B2 | 1/2010 | Iacona |
| 7,640,995 B2 | 1/2010 | Knobloch |
| 7,661,252 B2 | 2/2010 | Kitamura |
| D611,507 S | 3/2010 | Martin |
| 7,753,133 B2 | 7/2010 | Skolness |
| 7,762,002 B2 | 7/2010 | Proulx |
| 7,797,839 B2 | 9/2010 | Proulx |
| 7,814,984 B1 | 10/2010 | Fraley et al. |
| 7,878,260 B2 | 2/2011 | Notaras et al. |
| 7,882,642 B2 | 2/2011 | Proulx |
| 7,963,344 B2 | 6/2011 | Marcil et al. |
| 7,979,991 B2 | 7/2011 | Pfaltzgraff |
| 7,984,573 B2 | 7/2011 | Lau |
| 8,001,694 B2 | 8/2011 | Sing et al. |
| 8,025,249 B2 | 9/2011 | Alliss et al. |
| 8,122,554 B2 | 2/2012 | Schemmel et al. |
| 8,162,072 B2 | 4/2012 | Marcil et al. |
| 8,181,711 B1 | 5/2012 | Fraley et al. |
| 8,186,450 B2 | 5/2012 | Bauer |
| 8,210,272 B2 | 7/2012 | Notaras et al. |
| 8,230,602 B2 | 7/2012 | Arnetoli |
| 8,261,846 B2 | 9/2012 | Fraley et al. |
| 8,266,805 B1 | 9/2012 | Alliss |
| 8,297,034 B1 | 10/2012 | Mueller |
| 8,327,947 B2 | 12/2012 | Martindale et al. |
| 8,347,443 B1 | 1/2013 | Conrad |
| 8,429,886 B2 | 4/2013 | Kato et al. |
| 8,434,563 B2 | 5/2013 | Gendelman et al. |
| 8,464,431 B2 | 6/2013 | Reynolds et al. |
| 8,496,069 B2 | 7/2013 | Gendelman et al. |
| 8,496,071 B2 | 7/2013 | Fraley et al. |
| 8,510,960 B2 | 8/2013 | Pfaltzgraff et al. |
| D690,063 S | 9/2013 | Kent et al. |
| 8,549,827 B2 | 10/2013 | Kato et al. |
| 8,567,073 B2 | 10/2013 | Proulx |
| 8,567,074 B2 | 10/2013 | Arnetoli |
| 8,568,051 B2 | 10/2013 | Burnett |
| 8,607,889 B2 | 12/2013 | Marcil et al. |
| 8,615,887 B2 | 12/2013 | Arnetoli |
| 8,627,897 B2 | 1/2014 | Marcil et al. |
| 8,627,898 B2 | 1/2014 | Nance |

(56) References Cited

U.S. PATENT DOCUMENTS

| | | |
|---|---|---|
| 8,701,621 B2 | 4/2014 | Takeda et al. |
| 8,707,567 B2 | 4/2014 | Proulx |
| 8,745,879 B2 | 6/2014 | Alliss |
| 8,745,880 B2 | 6/2014 | Kato |
| 8,776,910 B1 | 7/2014 | Dallas et al. |
| D718,345 S | 11/2014 | Whalen |
| 8,910,387 B2 | 12/2014 | Alliss |
| 8,910,388 B2 | 12/2014 | Proulx |
| 8,915,219 B2 | 12/2014 | Nakamura et al. |
| 8,918,999 B2 | 12/2014 | Proulx et al. |
| 8,928,201 B2 | 1/2015 | Tanimoto et al. |
| 8,991,514 B2 | 3/2015 | Tozawa et al. |
| 9,041,320 B2 | 5/2015 | Untermann et al. |
| 9,049,816 B2 | 6/2015 | Ito et al. |
| 9,095,098 B2 | 8/2015 | Guenther et al. |
| 9,144,194 B2 | 9/2015 | Kato |
| 9,160,211 B2 | 10/2015 | Tanimoto et al. |
| 9,167,737 B2 | 10/2015 | McGowen |
| D745,759 S | 12/2015 | Kent et al. |
| 9,204,588 B1 | 12/2015 | Christie et al. |
| 9,224,995 B2 | 12/2015 | Martinsson et al. |
| 9,271,442 B2 | 3/2016 | Pellenc |
| 9,277,687 B2 | 3/2016 | Marcil et al. |
| 9,290,905 B1 | 3/2016 | Diaz et al. |
| 9,295,195 B2 | 3/2016 | Proulx et al. |
| 9,307,687 B2 | 4/2016 | Ruppel et al. |
| 9,320,189 B2 | 4/2016 | Nance |
| 9,322,344 B2 | 4/2016 | Isono et al. |
| 9,345,193 B2 | 5/2016 | Wu |
| 9,357,712 B2 | 6/2016 | Pickett et al. |
| 9,363,946 B2 | 6/2016 | Pellenc |
| 9,366,220 B2 | 6/2016 | Leufen et al. |
| 9,380,743 B2 | 7/2016 | Alliss |
| 9,392,737 B2 | 7/2016 | Sanderson |
| 9,439,339 B2 | 9/2016 | Hurd |
| 9,447,827 B2 | 9/2016 | Yuasa |
| 9,456,723 B2 | 10/2016 | Thorne et al. |
| 9,468,143 B2 | 10/2016 | Stark |
| 9,496,809 B2 | 11/2016 | Nakano et al. |
| 9,516,799 B2 | 12/2016 | Olsen |
| 9,516,807 B2 | 12/2016 | Alliss |
| 9,526,389 B2 | 12/2016 | Thorne et al. |
| 9,655,486 B2 | 5/2017 | Xu et al. |
| 9,670,837 B2 | 6/2017 | Honzawa et al. |
| 9,730,371 B2 | 8/2017 | Ruppel et al. |
| 9,736,974 B2 | 8/2017 | Hurd |
| D796,559 S | 9/2017 | Bruce |
| 9,752,630 B2 | 9/2017 | Yuasa |
| 9,756,783 B2 | 9/2017 | Nojiri et al. |
| 9,763,372 B2 | 9/2017 | Modzik et al. |
| 9,782,884 B2 | 10/2017 | Ota et al. |
| 9,826,679 B2 | 11/2017 | Lang et al. |
| 9,839,172 B2 | 12/2017 | Meier et al. |
| 9,844,189 B2 | 12/2017 | Baker |
| 9,844,307 B2 | 12/2017 | Muir |
| 9,854,738 B2 | 1/2018 | Miller et al. |
| 9,861,033 B2 | 1/2018 | Skinner et al. |
| 9,872,429 B2 | 1/2018 | Ma et al. |
| 9,877,435 B2 | 1/2018 | Li et al. |
| 9,907,234 B2 | 3/2018 | Poole et al. |
| 9,924,631 B2 | 3/2018 | Alliss |
| 9,955,627 B2 | 5/2018 | Nakano et al. |
| 9,955,832 B2 | 5/2018 | Thorne et al. |
| D825,293 S | 8/2018 | Alliss |
| 10,051,772 B2 | 8/2018 | Freed et al. |
| 10,064,329 B1 | 9/2018 | Lovmark |
| 10,105,832 B2 | 10/2018 | Martinsson et al. |
| 10,130,030 B2 | 11/2018 | Sprungman et al. |
| 10,149,433 B2 | 12/2018 | Wyne |
| 10,159,171 B1 | 12/2018 | Christie et al. |
| D838,811 S | 1/2019 | Kornblum |
| 10,226,157 B2 | 3/2019 | Xu et al. |
| 10,247,165 B2 | 4/2019 | Eto et al. |
| 10,264,725 B2 | 4/2019 | Guo et al. |
| 10,273,112 B2 | 4/2019 | Alliss |
| 10,278,321 B2 | 5/2019 | Parkey |
| 10,299,430 B2 | 5/2019 | Miller et al. |
| 10,314,228 B2 | 6/2019 | Ma et al. |
| 10,314,229 B2 | 6/2019 | Arnetoli |
| 10,327,381 B2 | 6/2019 | Arnetoli |
| 10,334,778 B2 | 7/2019 | Kullberg |
| 10,334,779 B2 | 7/2019 | Kågebäck et al. |
| 10,350,743 B2 | 7/2019 | Fu et al. |
| 10,362,721 B2 | 7/2019 | Hurd |
| 10,371,044 B2 | 8/2019 | Karrar |
| 10,390,471 B2 | 8/2019 | Bruce |
| 10,398,071 B2 | 9/2019 | Ruppel et al. |
| 10,433,491 B2 | 10/2019 | Li et al. |
| 10,439,415 B2 | 10/2019 | Zhu et al. |
| 10,440,882 B2 | 10/2019 | Guo et al. |
| 10,506,754 B2 | 12/2019 | Christie et al. |
| 10,517,209 B2 | 12/2019 | Kullberg |
| 10,517,210 B2 | 12/2019 | Cabrera |
| 10,517,385 B2 | 12/2019 | Kress |
| 10,537,057 B2 | 1/2020 | Sergyeyenko et al. |
| D878,430 S | 3/2020 | Bruce |
| D878,431 S | 3/2020 | Bruce |
| 10,575,472 B2 | 3/2020 | Baker |
| 10,638,666 B2 | 5/2020 | Fu |
| 10,645,878 B2 | 5/2020 | Zhang et al. |
| 10,645,884 B2 | 5/2020 | Poole et al. |
| RE48,068 E | 6/2020 | Nojiri et al. |
| 10,716,253 B2 | 7/2020 | Zenkus et al. |
| 10,722,023 B2 | 7/2020 | Zhai |
| 10,772,258 B2 | 9/2020 | Sugiyama |
| 10,820,462 B2 | 11/2020 | Christie et al. |
| 10,820,685 B1 | 11/2020 | Becker |
| 10,856,466 B2 | 12/2020 | Guo et al. |
| 2002/0026714 A1 | 3/2002 | Peterson et al. |
| 2002/0073556 A1 | 6/2002 | Fogle |
| 2002/0144408 A1 | 10/2002 | Cho |
| 2002/0189107 A1 | 12/2002 | Arnetoli |
| 2004/0065289 A1 | 4/2004 | Leasure et al. |
| 2004/0123828 A1 | 7/2004 | Sing et al. |
| 2004/0128840 A1 | 7/2004 | Proulx et al. |
| 2004/0148784 A1 | 8/2004 | Grace |
| 2004/0149466 A1 | 8/2004 | Stark |
| 2004/0154276 A1 | 8/2004 | Brandon |
| 2004/0255895 A1 | 12/2004 | Hirsch et al. |
| 2005/0045347 A1 | 3/2005 | Stark et al. |
| 2005/0167125 A1 | 8/2005 | Martindale |
| 2005/0183411 A1 | 8/2005 | Stanley |
| 2005/0252184 A1 | 11/2005 | Craig |
| 2005/0274532 A1 | 12/2005 | Lephart et al. |
| 2006/0053636 A1 | 3/2006 | Fogle |
| 2006/0070753 A1 | 4/2006 | Lephart et al. |
| 2006/0124324 A1 | 6/2006 | Neusink et al. |
| 2006/0191143 A1 | 8/2006 | Brandon |
| 2006/0254061 A1 | 11/2006 | Alliss |
| 2007/0180704 A1 | 8/2007 | Chiu |
| 2007/0180705 A1 | 8/2007 | Chiu |
| 2007/0287571 A1 | 12/2007 | Li |
| 2008/0022484 A1 | 1/2008 | Caruso |
| 2008/0128147 A1 | 6/2008 | Lynch |
| 2008/0201877 A1 | 8/2008 | Sengewald et al. |
| 2008/0236851 A1 | 10/2008 | Winkle |
| 2008/0282554 A1 | 11/2008 | Grace |
| 2009/0044351 A1 | 2/2009 | Menrik et al. |
| 2009/0050341 A1 | 2/2009 | Hathaway et al. |
| 2009/0173053 A1 | 7/2009 | Stanley |
| 2010/0154229 A1 | 6/2010 | Iacona et al. |
| 2010/0186240 A1 | 7/2010 | Waugh |
| 2010/0229403 A1 | 9/2010 | Apfel et al. |
| 2011/0131817 A1 | 6/2011 | Ito |
| 2011/0239468 A1 | 10/2011 | Conlon |
| 2011/0240319 A1 | 10/2011 | Sanderson |
| 2011/0297404 A1 | 12/2011 | Welch |
| 2011/0302791 A1 | 12/2011 | Proulx et al. |
| 2011/0302898 A1 | 12/2011 | Craig |
| 2012/0073258 A1 | 3/2012 | Stanley |
| 2012/0104983 A1 | 5/2012 | Tanimoto et al. |
| 2012/0159792 A1 | 6/2012 | Hoelscher |
| 2012/0198706 A1 | 8/2012 | Yang et al. |
| 2012/0234122 A1 | 9/2012 | Naka |

(56) References Cited

U.S. PATENT DOCUMENTS

| | | |
|---|---|---|
| 2012/0279743 A1 | 11/2012 | Suda et al. |
| 2013/0014996 A1 | 1/2013 | Ruppel et al. |
| 2013/0049477 A1 | 2/2013 | Tozawa et al. |
| 2013/0133903 A1 | 5/2013 | Lipscomb |
| 2013/0180547 A1 | 7/2013 | Kent et al. |
| 2013/0185946 A1 | 7/2013 | Apfel et al. |
| 2014/0053416 A1 | 2/2014 | Proulx |
| 2014/0083375 A1 | 3/2014 | Kawashima et al. |
| 2014/0345893 A1 | 11/2014 | Christie et al. |
| 2015/0068783 A1 | 3/2015 | Pickett et al. |
| 2015/0075010 A1 | 3/2015 | Proulx |
| 2015/0107120 A1 | 4/2015 | Proulx et al. |
| 2016/0007520 A1 | 1/2016 | McGowen |
| 2016/0021818 A1 | 1/2016 | Salsbery |
| 2016/0106034 A1 | 4/2016 | Arnetoli |
| 2016/0128276 A1 | 5/2016 | Arnetoli |
| 2016/0143218 A1 | 5/2016 | Sergyeyenko et al. |
| 2016/0183452 A1 | 6/2016 | Kullberg |
| 2016/0271783 A1 | 9/2016 | Pickett et al. |
| 2016/0305438 A1 | 10/2016 | Yamamoto et al. |
| 2017/0034984 A1 | 2/2017 | Olsen |
| 2017/0094900 A1 | 4/2017 | Arnetoli |
| 2017/0349394 A1 | 12/2017 | Alliss |
| 2018/0020614 A1 | 1/2018 | Alliss |
| 2018/0020615 A1 | 1/2018 | Alliss |
| 2018/0094393 A1 | 4/2018 | Takahashi et al. |
| 2018/0110182 A1 | 4/2018 | Nolin et al. |
| 2018/0116106 A1 | 5/2018 | Kullberg et al. |
| 2018/0132417 A1 | 5/2018 | Alliss |
| 2018/0168098 A1 | 6/2018 | Alliss |
| 2018/0177122 A1 | 6/2018 | Skinner |
| 2018/0263184 A1 | 9/2018 | Cline |
| 2018/0294656 A1 | 10/2018 | Iwata et al. |
| 2018/0325035 A1 | 11/2018 | Chung et al. |
| 2018/0333753 A1 | 11/2018 | Nolin et al. |
| 2019/0059213 A1 | 2/2019 | Sprungman et al. |
| 2019/0075721 A1 | 3/2019 | Cholst et al. |
| 2019/0109478 A1 | 4/2019 | Zhu et al. |
| 2019/0116714 A1 | 4/2019 | Christie et al. |
| 2019/0116728 A1 | 4/2019 | Zenkus et al. |
| 2019/0185289 A1 | 6/2019 | Alliss |
| 2019/0216013 A1 | 7/2019 | Guo et al. |
| 2019/0261549 A1 | 8/2019 | Christie et al. |
| 2019/0261557 A1 | 8/2019 | Ma et al. |
| 2019/0269289 A1 | 9/2019 | Xu et al. |
| 2019/0274500 A1 | 9/2019 | Thorne et al. |
| 2019/0320865 A1 | 10/2019 | Brown et al. |
| 2019/0341794 A1 | 11/2019 | Zhu et al. |
| 2020/0008348 A1 | 1/2020 | Guo et al. |
| 2020/0029497 A1 | 1/2020 | Guo et al. |
| 2020/0030958 A1 | 1/2020 | Chan |
| 2020/0053940 A1 | 2/2020 | Ruppel et al. |
| 2020/0067337 A1 | 2/2020 | Nakamoto et al. |
| 2020/0079614 A1 | 3/2020 | Cigarini et al. |
| 2020/0113131 A1 | 4/2020 | Arnetoli |
| 2020/0129031 A1 | 4/2020 | Kress |
| 2020/0137965 A1 | 5/2020 | Register |
| 2020/0138179 A1 | 5/2020 | Keiser et al. |
| 2020/0139514 A1 | 5/2020 | Clifford et al. |
| 2020/0170182 A1* | 6/2020 | Guo .................. A01D 34/4166 |
| 2020/0196533 A1 | 6/2020 | Wu et al. |
| 2020/0198097 A1 | 6/2020 | Keiser et al. |
| 2020/0212837 A1 | 7/2020 | Ichikawa et al. |
| 2020/0212838 A1 | 7/2020 | Nakamoto et al. |
| 2020/0236845 A1 | 7/2020 | Wang et al. |
| 2020/0236848 A1 | 7/2020 | Guo et al. |
| 2020/0236875 A1 | 7/2020 | Poole et al. |
| 2020/0246998 A1 | 8/2020 | Niiyama |
| 2020/0260643 A1 | 8/2020 | Hata et al. |
| 2020/0267902 A1 | 8/2020 | Zhang et al. |
| 2020/0296888 A1 | 9/2020 | Arnetoli |
| 2020/0315089 A1 | 10/2020 | Racz et al. |
| 2021/0015035 A1 | 1/2021 | Guo et al. |
| 2023/0000008 A1 | 1/2023 | Cholst |
| 2023/0000009 A1 | 1/2023 | Cholst |
| 2023/0000010 A1 | 1/2023 | Cholst et al. |
| 2023/0000011 A1 | 1/2023 | Cholst et al. |

FOREIGN PATENT DOCUMENTS

| | | |
|---|---|---|
| CN | 201222848 Y | 4/2009 |
| CN | 201450714 U | 5/2010 |
| CN | 201541438 U | 8/2010 |
| CN | 201645232 U | 11/2010 |
| CN | 201839620 U | 5/2011 |
| CN | 102349367 A | 2/2012 |
| CN | 102369810 A | 3/2012 |
| CN | 102388688 A | 3/2012 |
| CN | 202262256 U | 6/2012 |
| CN | 202617619 U | 12/2012 |
| CN | 202818968 U | 3/2013 |
| CN | 202998783 U | 6/2013 |
| CN | 203120459 U | 8/2013 |
| CN | 103299835 A | 9/2013 |
| CN | 203181557 U | 9/2013 |
| CN | 203206734 U | 9/2013 |
| CN | 103404309 A | 11/2013 |
| CN | 203301952 U | 11/2013 |
| CN | 103430687 A | 12/2013 |
| CN | 203435367 U | 2/2014 |
| CN | 203504961 U | 4/2014 |
| CN | 104115609 A | 10/2014 |
| CN | 204069639 U | 1/2015 |
| CN | 204206729 U | 3/2015 |
| CN | 104663026 A | 6/2015 |
| CN | 104782247 A | 7/2015 |
| CN | 104823538 A | 8/2015 |
| CN | 204560136 U | 8/2015 |
| CN | 103548434 B | 9/2015 |
| CN | 204707415 U | 10/2015 |
| CN | 204724895 U | 10/2015 |
| CN | 105052356 A | 11/2015 |
| CN | 204761980 U | 11/2015 |
| CN | 204948761 U | 1/2016 |
| CN | 105284270 A | 2/2016 |
| CN | 105359707 A | 3/2016 |
| CN | 105393695 A | 3/2016 |
| CN | 105393696 A | 3/2016 |
| CN | 205105540 U | 3/2016 |
| CN | 103286393 B | 4/2016 |
| CN | 105507806 A | 4/2016 |
| CN | 205142981 U | 4/2016 |
| CN | 105594362 A | 5/2016 |
| CN | 205232795 U | 5/2016 |
| CN | 205232798 U | 5/2016 |
| CN | 105794342 A | 7/2016 |
| CN | 205357121 U | 7/2016 |
| CN | 205399324 U | 7/2016 |
| CN | 105874918 A | 8/2016 |
| CN | 105874921 A | 8/2016 |
| CN | 205430100 U | 8/2016 |
| CN | 103404294 B | 9/2016 |
| CN | 106235967 A | 12/2016 |
| CN | 106416464 A | 2/2017 |
| CN | 205961825 U | 2/2017 |
| CN | 206007154 U | 3/2017 |
| CN | 104885608 B | 4/2017 |
| CN | 105493662 B | 6/2017 |
| CN | 206251578 U | 6/2017 |
| CN | 106922226 A | 7/2017 |
| CN | 206423136 U | 8/2017 |
| CN | 206547259 U | 10/2017 |
| CN | 107371404 A | 11/2017 |
| CN | 206658380 U | 11/2017 |
| CN | 206743789 U | 12/2017 |
| CN | 206776065 U | 12/2017 |
| CN | 207040310 U | 2/2018 |
| CN | 105612905 B | 3/2018 |
| CN | 207235369 U | 4/2018 |
| CN | 207382811 U | 5/2018 |
| CN | 105917763 B | 6/2018 |
| CN | 207444904 U | 6/2018 |
| CN | 207505355 U | 6/2018 |

(56) References Cited

FOREIGN PATENT DOCUMENTS

| | | |
|---|---|---|
| CN | 108450064 A | 8/2018 |
| CN | 108575123 A | 9/2018 |
| CN | 207869611 U | 9/2018 |
| CN | 207869613 U | 9/2018 |
| CN | 108901311 A | 11/2018 |
| CN | 208079682 U | 11/2018 |
| CN | 208175262 U | 12/2018 |
| CN | 208227601 U | 12/2018 |
| CN | 106034412 B | 1/2019 |
| CN | 208338368 U | 1/2019 |
| CN | 208353830 U | 1/2019 |
| CN | 208387296 U | 1/2019 |
| CN | 109417934 A | 3/2019 |
| CN | 106941788 B | 4/2019 |
| CN | 208708144 U | 4/2019 |
| CN | 208783289 U | 4/2019 |
| CN | 208987318 U | 6/2019 |
| CN | 208987320 U | 6/2019 |
| CN | 208987321 U | 6/2019 |
| CN | 208987324 U | 6/2019 |
| CN | 209057530 U | 7/2019 |
| CN | 209151588 U | 7/2019 |
| CN | 209170912 U | 7/2019 |
| CN | 209201539 U | 8/2019 |
| CN | 209358935 U | 9/2019 |
| CN | 209359016 U | 9/2019 |
| CN | 110291882 A | 10/2019 |
| CN | 110352693 A | 10/2019 |
| CN | 209609119 U | 11/2019 |
| CN | 110557981 A | 12/2019 |
| CN | 209749148 U | 12/2019 |
| CN | 209787751 U | 12/2019 |
| CN | 110679211 A | 1/2020 |
| CN | 209930839 U | 1/2020 |
| CN | 110810044 A | 2/2020 |
| CN | 210168414 U | 3/2020 |
| CN | 111010893 A | 4/2020 |
| CN | 210470200 U | 5/2020 |
| CN | 210580046 U | 5/2020 |
| CN | 109845430 B | 6/2020 |
| CN | 210726020 U | 6/2020 |
| CN | 210781975 U | 6/2020 |
| CN | 211047783 U | 7/2020 |
| CN | 211047784 U | 7/2020 |
| CN | 211152632 U | 8/2020 |
| CN | 211210519 U | 8/2020 |
| CN | 211240702 U | 8/2020 |
| CN | 111615871 A | 9/2020 |
| CN | 111623093 A | 9/2020 |
| CN | 211378812 U | 9/2020 |
| CN | 211457896 U | 9/2020 |
| CN | 105284209 B | 10/2020 |
| CN | 109077437 B | 11/2020 |
| CN | 216399524 U | 4/2022 |
| DE | 559014 C | 9/1932 |
| DE | 585827 C | 10/1933 |
| DE | 606258 C | 11/1934 |
| DE | 632687 C | 7/1936 |
| DE | 1024279 B | 2/1958 |
| DE | 1057371 B | 5/1959 |
| DE | 1837331 U | 9/1961 |
| DE | 2000740 A1 | 8/1971 |
| DE | 2145899 A1 | 3/1972 |
| DE | 2618842 A1 | 11/1977 |
| DE | 3043175 A1 | 10/1982 |
| DE | 3300134 A1 | 7/1983 |
| DE | 8332487 U1 | 6/1985 |
| DE | 8625564 U1 | 12/1986 |
| DE | 8712938 U1 | 12/1987 |
| DE | 3728061 C1 | 7/1988 |
| DE | 9000712 U1 | 3/1990 |
| DE | 9002359 U1 | 5/1990 |
| DE | 9201863 U1 | 6/1992 |
| DE | 9410781 U1 | 11/1994 |
| DE | 4229823 C2 | 5/1995 |
| DE | 4344571 A1 | 6/1995 |
| DE | 19506497 A1 | 10/1996 |
| DE | 29611986 U1 | 10/1996 |
| DE | 19627715 A1 | 4/1998 |
| DE | 19905175 C2 | 11/2000 |
| DE | 10330649 A1 | 1/2005 |
| DE | 102004028912 A1 | 1/2006 |
| DE | 102004041914 A1 | 3/2006 |
| DE | 102005021467 A1 | 11/2006 |
| DE | 202006012391 U1 | 11/2006 |
| DE | 202010003187 U1 | 6/2010 |
| DE | 102007054278 B3 | 7/2010 |
| DE | 202012103230 U1 | 12/2013 |
| DE | 102014010692 A1 | 1/2016 |
| DE | 102015005488 A1 | 11/2016 |
| DE | 202017106599 U1 | 12/2017 |
| DE | 102017126467 A1 | 5/2019 |
| DE | 202020002176 U1 | 7/2020 |
| DE | 202020002177 U1 | 8/2020 |
| EP | 0051175 A1 | 5/1982 |
| EP | 0118315 A2 | 9/1984 |
| EP | 0053839 B1 | 10/1985 |
| EP | 0140989 B1 | 6/1987 |
| EP | 0293675 B1 | 7/1990 |
| EP | 0260643 B1 | 11/1991 |
| EP | 0512784 A1 | 11/1992 |
| EP | 0636307 A1 | 2/1995 |
| EP | 0472102 B1 | 3/1995 |
| EP | 0916242 A2 | 5/1999 |
| EP | 0737415 B1 | 7/1999 |
| EP | 1013158 A1 | 6/2000 |
| EP | 1048193 A1 | 11/2000 |
| EP | 0885553 B1 | 8/2001 |
| EP | 0972436 B1 | 1/2005 |
| EP | 1714537 A1 | 10/2006 |
| EP | 1080618 B1 | 12/2008 |
| EP | 2033507 B1 | 7/2011 |
| EP | 1816265 B1 | 12/2012 |
| EP | 2602504 B1 | 5/2014 |
| EP | 2995186 B1 | 3/2018 |
| EP | 3014975 B1 | 5/2018 |
| EP | 2404491 B1 | 11/2018 |
| EP | 3586607 A1 | 1/2020 |
| EP | 3646756 A1 | 5/2020 |
| JP | 2006020627 A | 1/2006 |
| KR | 101795453 B1 | 12/2017 |
| KR | 1020210053070 A | 5/2021 |
| WO | WO8400465 A1 | 2/1984 |
| WO | WO8803746 A1 | 6/1988 |
| WO | WO9607306 A1 | 3/1996 |
| WO | WO03011009 A1 | 2/2003 |
| WO | WO2004010766 A1 | 2/2004 |
| WO | WO2005001207 A1 | 1/2005 |
| WO | WO2005043977 A2 | 5/2005 |
| WO | 2005110685 A2 | 11/2005 |
| WO | WO2006061928 A1 | 6/2006 |
| WO | WO2010087970 A1 | 8/2010 |
| WO | WO2010100758 A1 | 9/2010 |
| WO | WO2011035930 A1 | 3/2011 |
| WO | WO2012034355 A1 | 3/2012 |
| WO | WO2012070736 A1 | 5/2012 |
| WO | WO2013125912 A1 | 8/2013 |
| WO | WO2013187812 A1 | 12/2013 |
| WO | WO2014073013 A2 | 5/2014 |
| WO | WO2014119116 A1 | 8/2014 |
| WO | WO2014119174 A1 | 8/2014 |
| WO | WO2014119175 A1 | 8/2014 |
| WO | WO2014119181 A1 | 8/2014 |
| WO | WO2015064291 A1 | 5/2015 |
| WO | WO2015107731 A1 | 7/2015 |
| WO | WO2015137110 A1 | 9/2015 |
| WO | WO2016143161 A1 | 9/2016 |
| WO | WO2017006981 A1 | 1/2017 |
| WO | WO2017046046 A1 | 3/2017 |
| WO | WO2017056591 A1 | 4/2017 |
| WO | 2018057428 A1 | 3/2018 |
| WO | WO2018059713 A1 | 4/2018 |
| WO | WO2018068324 A1 | 4/2018 |
| WO | WO2018154147 A1 | 8/2018 |

(56) References Cited

FOREIGN PATENT DOCUMENTS

| WO | WO2018176295 A1 | 10/2018 |
| WO | WO2019154660 A1 | 8/2019 |
| WO | WO2019174863 A1 | 9/2019 |
| WO | WO2019185123 A1 | 10/2019 |
| WO | WO2019192201 A1 | 10/2019 |
| WO | WO2019196677 A1 | 10/2019 |
| WO | WO0003583 A2 | 1/2020 |
| WO | WO2020065329 A1 | 4/2020 |

OTHER PUBLICATIONS

Makita, "XRU17PT 36V (18V x2) LXT® Brushless String Trimmer Kit (5.0Ah)," <https://www.makitatools.com/products/details/XRU17PT> web page visited May 2, 2022.

Makita, "XUX01M5PT 36V (18V x2) LXT® Brushless Couple Shaft Power Head Kit with String Trimmer Attachment (5.0Ah)," <https://www.makitatools.com/products/details/XUX01M5PT> web page visited May 2, 2022.

Makita, "Couple Shaft Power Head and Attachments," <https://www.makitatools.com/ope/ope-shop/cordless-power-head> web page visited May 2, 2022.

Makita, "XUX01," Parts Breakdown, Rev. 0, Nov. 16, 2017 (6 pages).

Troy-Bilt, "Troy-Bilt Mini-Tiller," Owner/Operator Manual, © 1994 (24 pages).

International Search Report and Written Opinion for Application No. PCT/US2022/025227 dated Aug. 1, 2022 (11 pages).

* cited by examiner

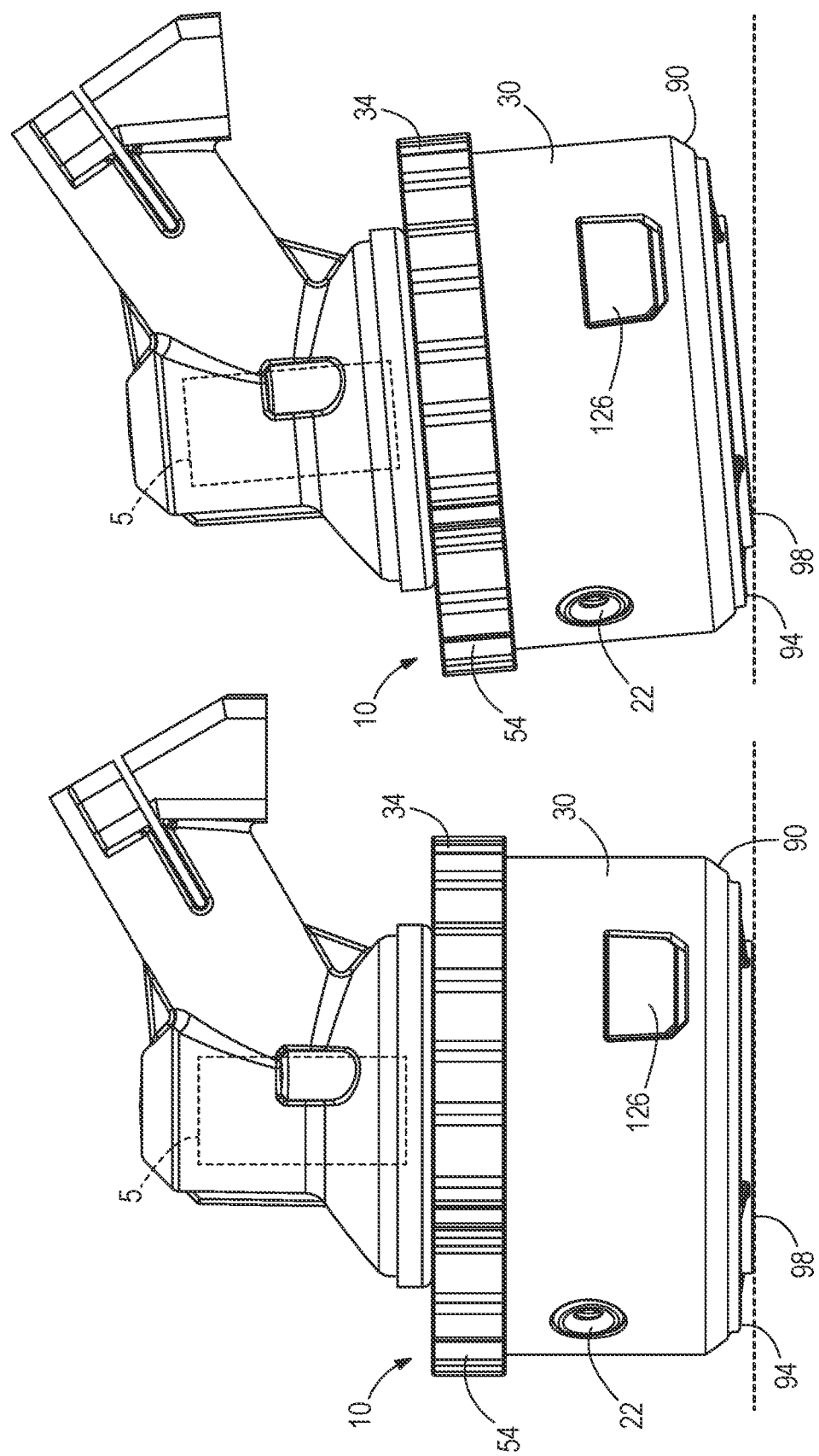

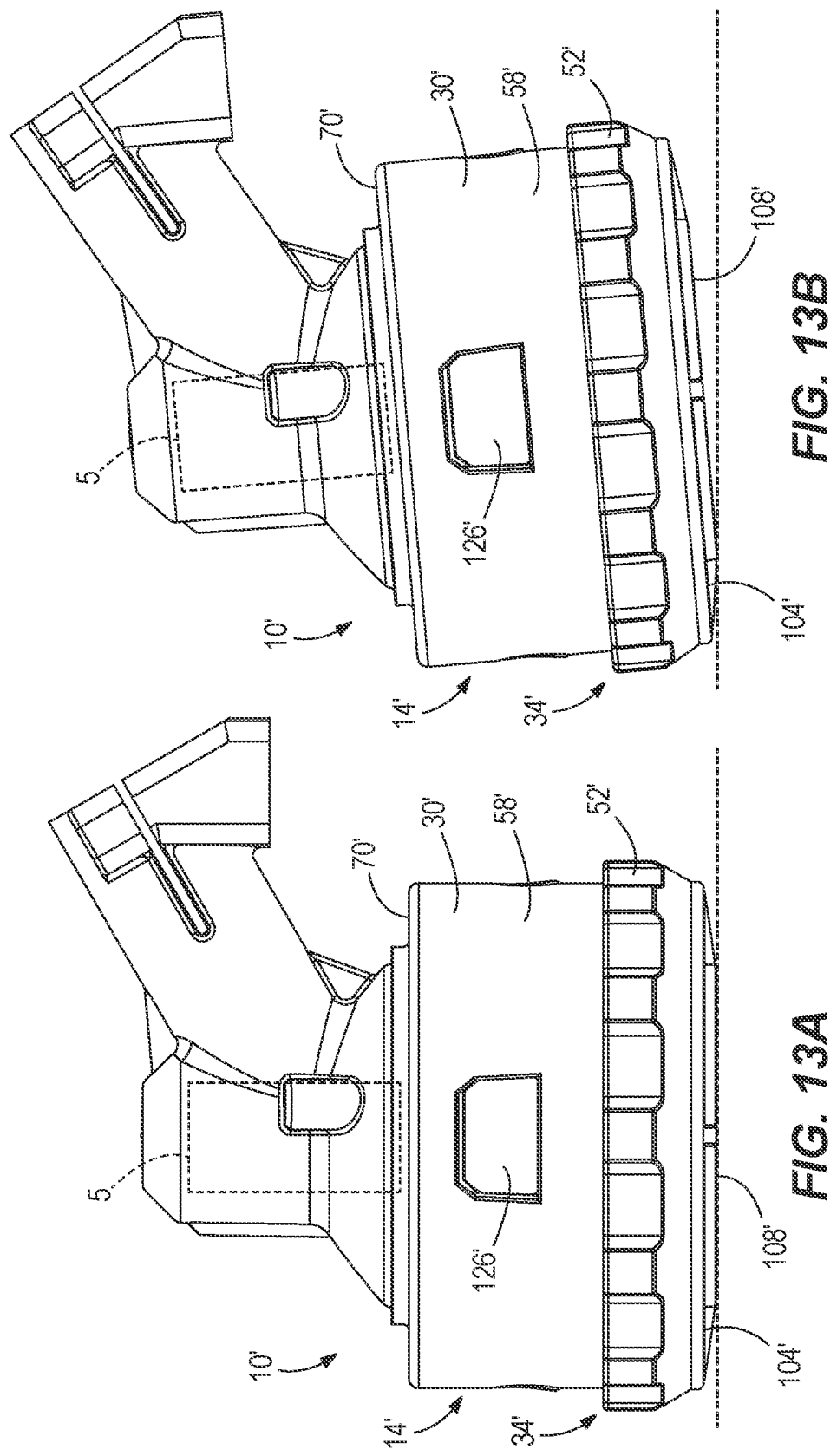

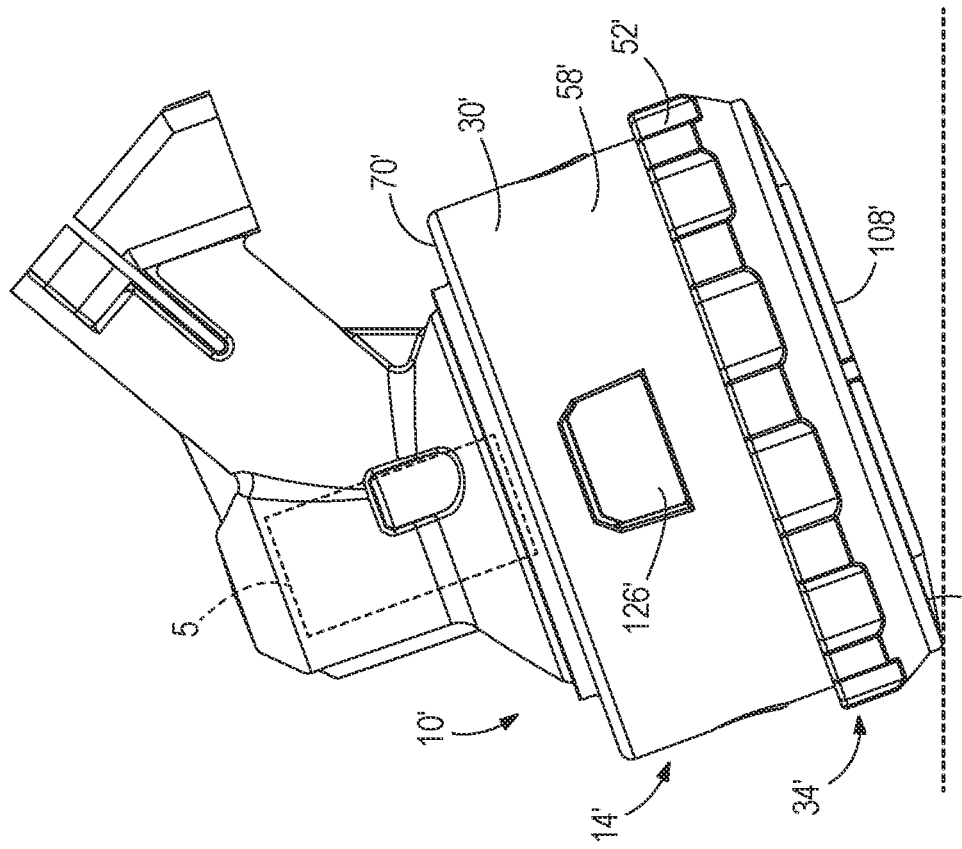
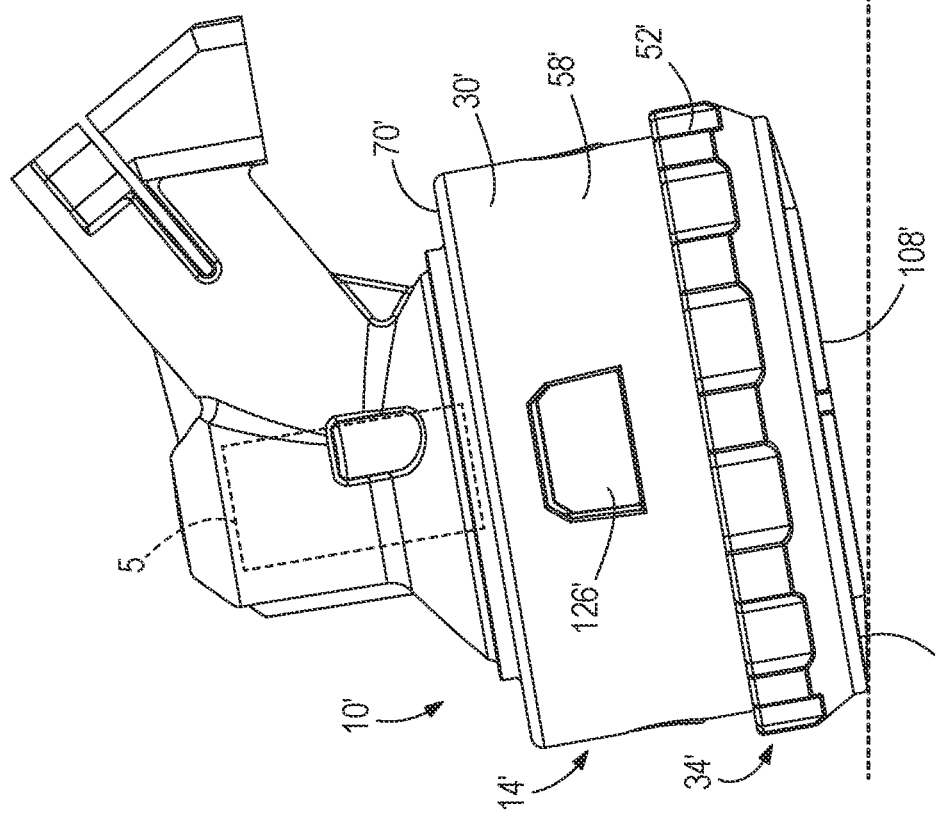

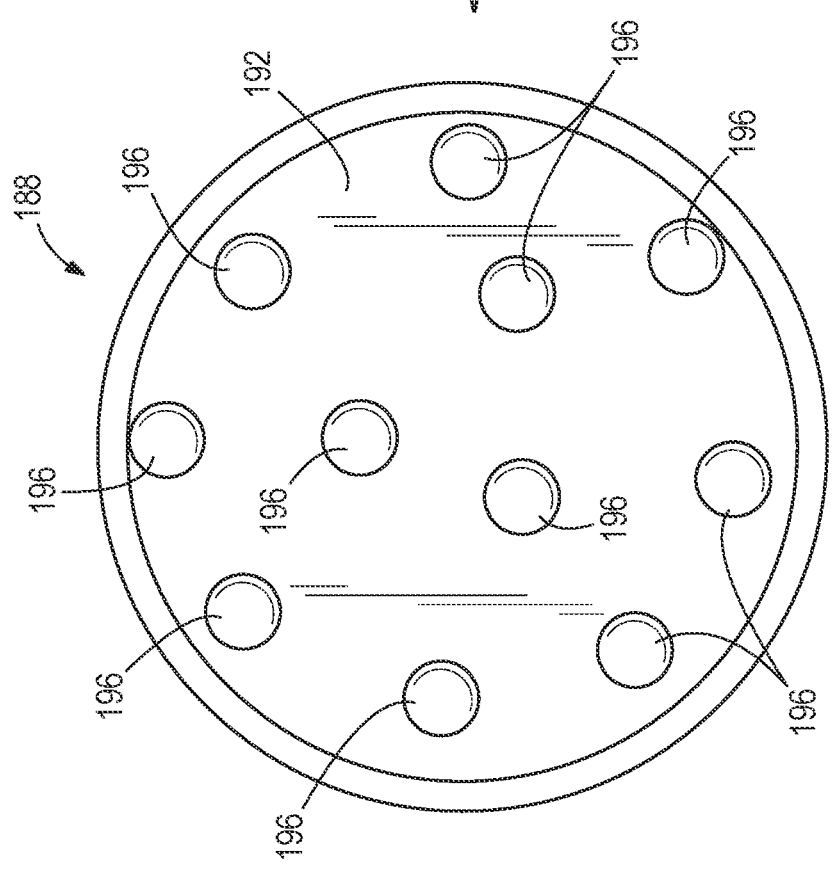

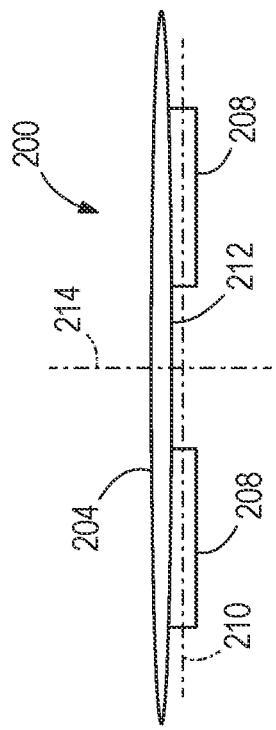
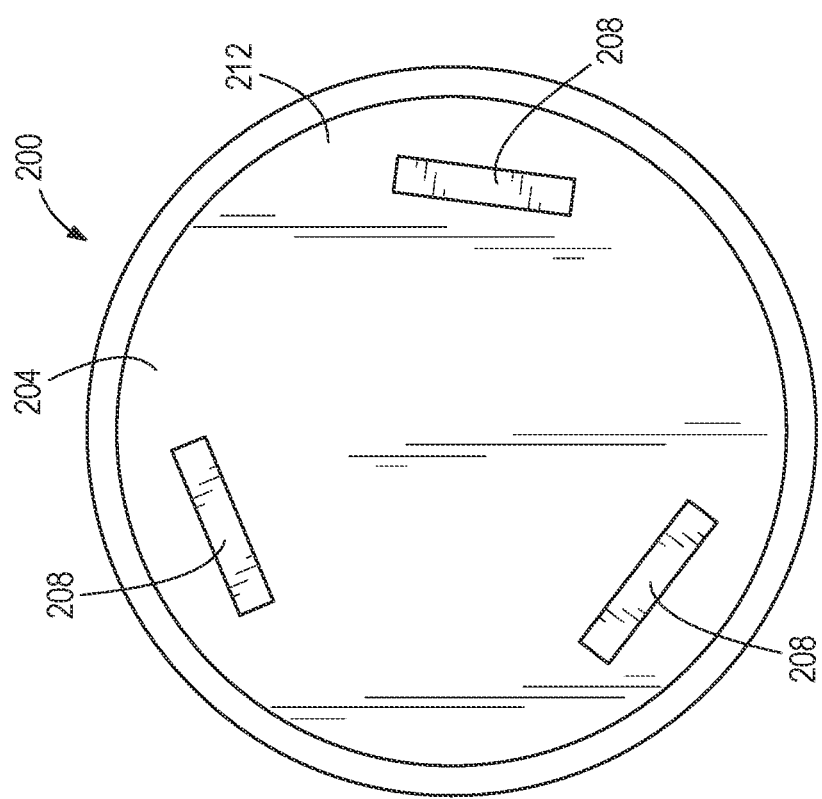

STRING TRIMMER HEAD

CROSS-REFERENCE TO RELATED APPLICATIONS

This application claims priority to U.S. Provisional Patent Application No. 63/176,636, filed on Apr. 19, 2021, to U.S. Provisional Patent Application No. 63/213,410, filed on Jun. 22, 2021, and to U.S. Provisional Patent Application No. 63/241,200, filed on Sep. 7, 2021, the entire contents of which are incorporated herein by reference.

FIELD

The present disclosure relates to trimmers and, more particularly, to a string trimmer head.

BACKGROUND

Generally, trimmers are used to cut grass and weeds and are often used to edge around trees, near fences and walls, and along landscape borders. Conventional string trimmers include an elongated shaft with a rotating element or head near the end of the elongated shaft, and a spool or string head is attached to the gear head. Typically, the string head includes a monofilament line (i.e., trimmer line) rotated by the head for cutting and trimming along landscaped areas, fences, walls, etc.

SUMMARY

In one independent aspect, a trimmer head including a housing rotatable about a rotational axis, the housing including a main body defining a cavity, and a cap removably coupled to the main body, a spool supported in the cavity and operable to support line to be dispensed, a retainer positioned between the housing and the spool, and a first ring protruding from a distal end of the housing.

In another independent aspect, a trimmer head includes a housing rotatable about a rotational axis, the housing including a main body defining a cavity, and a cap removably coupled to the main body, a spool supported in the cavity and operable to support line to be dispensed, a retainer positioned between the housing and the spool, and an attachment removably coupled to a distal end of the housing.

In another independent aspect, a trimmer head for use with a string trimmer including a drive shaft, the trimmer head including a housing rotatable about a rotational axis, the housing including a main body defining a cavity, wherein the main body includes a sidewall, a base wall, and a chamfered edge extending between the sidewall and the base wall, and a cap removably coupled to the main body, a spool supported in the cavity and operable to support line to be dispensed, wherein the spool is drivingly coupled to the drive shaft, a retainer positioned between the housing and the spool, and a first ring protruding from the base wall of the main body.

Other independent aspects of the disclosure may become apparent by consideration of the detailed description, claims and accompanying drawings.

BRIEF DESCRIPTION OF THE DRAWINGS

FIGS. 7A-7F are perspectives view of the trimmer head of FIG. 2 bumped at various positions.

FIGS. 13A-13F are perspectives view of the trimmer head of FIG. 8 bumped at various positions.

FIGS. 15A-15B are side views of another wear attachment configured to couple to the trimmer head of FIG. 1 or the trimmer head of FIG. 8.

FIGS. 17A-17B are side views of another wear attachment configured to couple to the trimmer head of FIG. 1 or the trimmer head of FIG. 8.

DETAILED DESCRIPTION

Before any independent embodiments of the disclosure are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Figure 1:
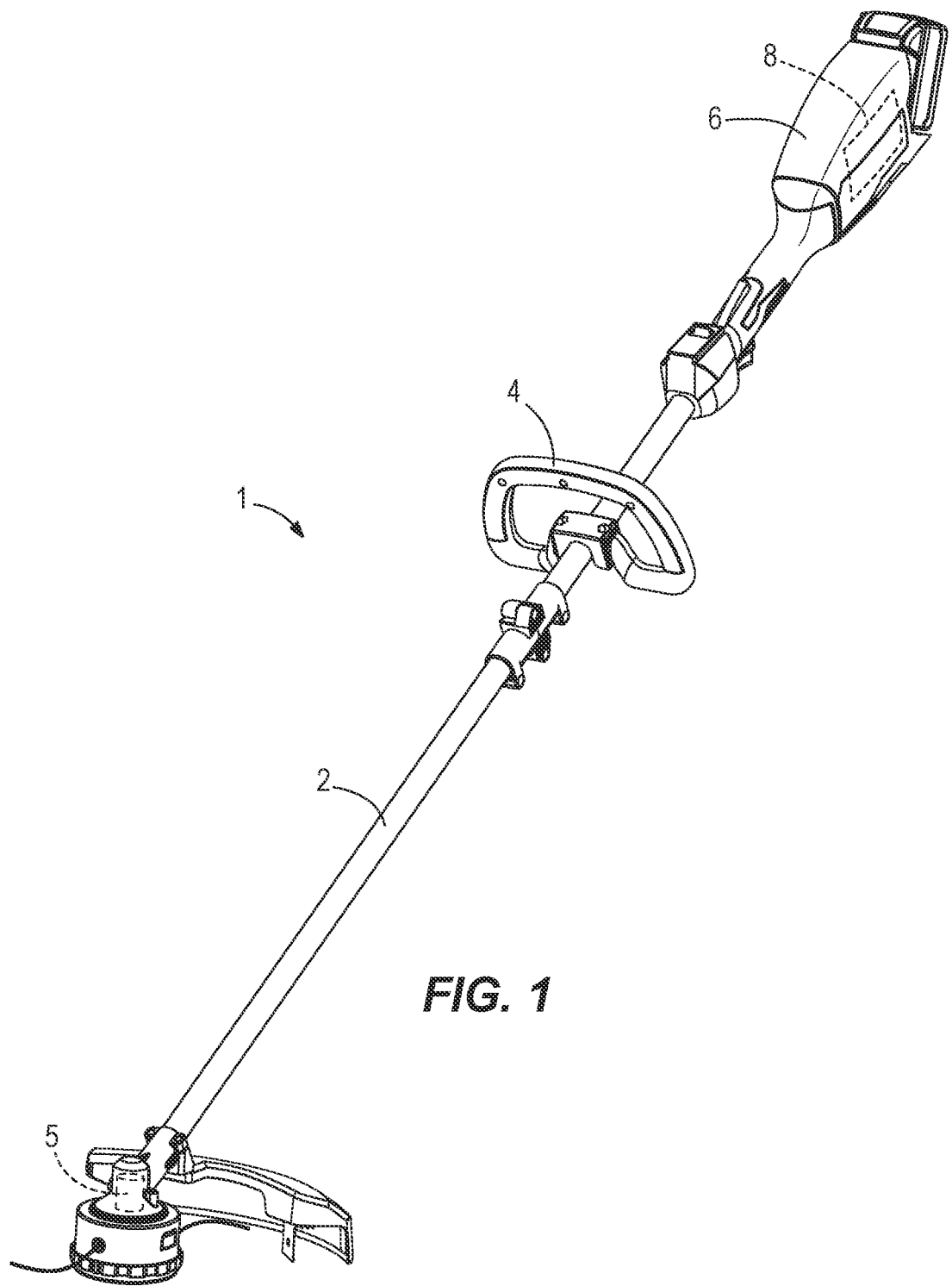
FIG. 1 is a perspective view of a string trimmer, according to embodiments disclosed herein.
Figure 2:
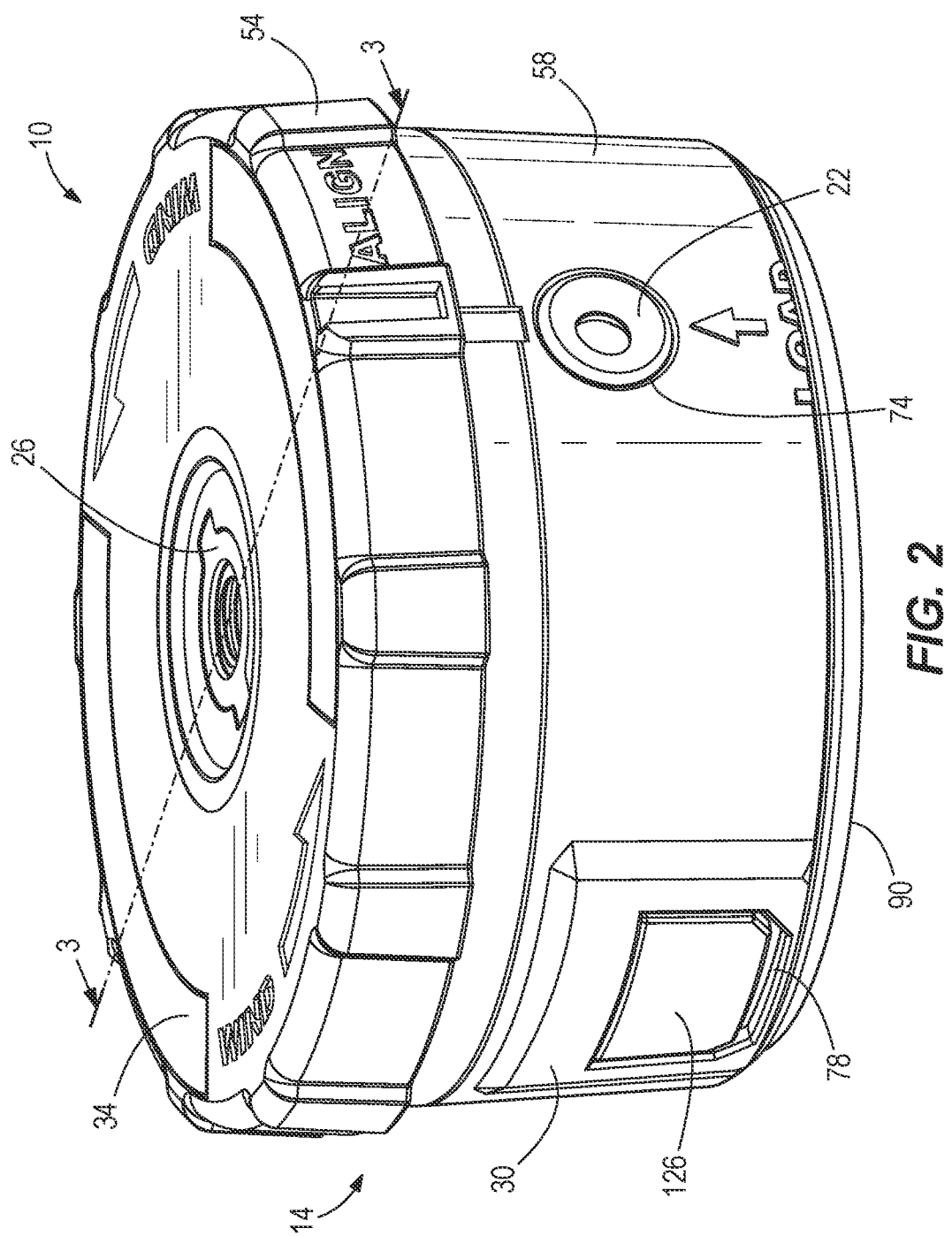
FIG. 2 is a perspective view of a trimmer head, according to embodiments disclosed herein.
Figure 3:
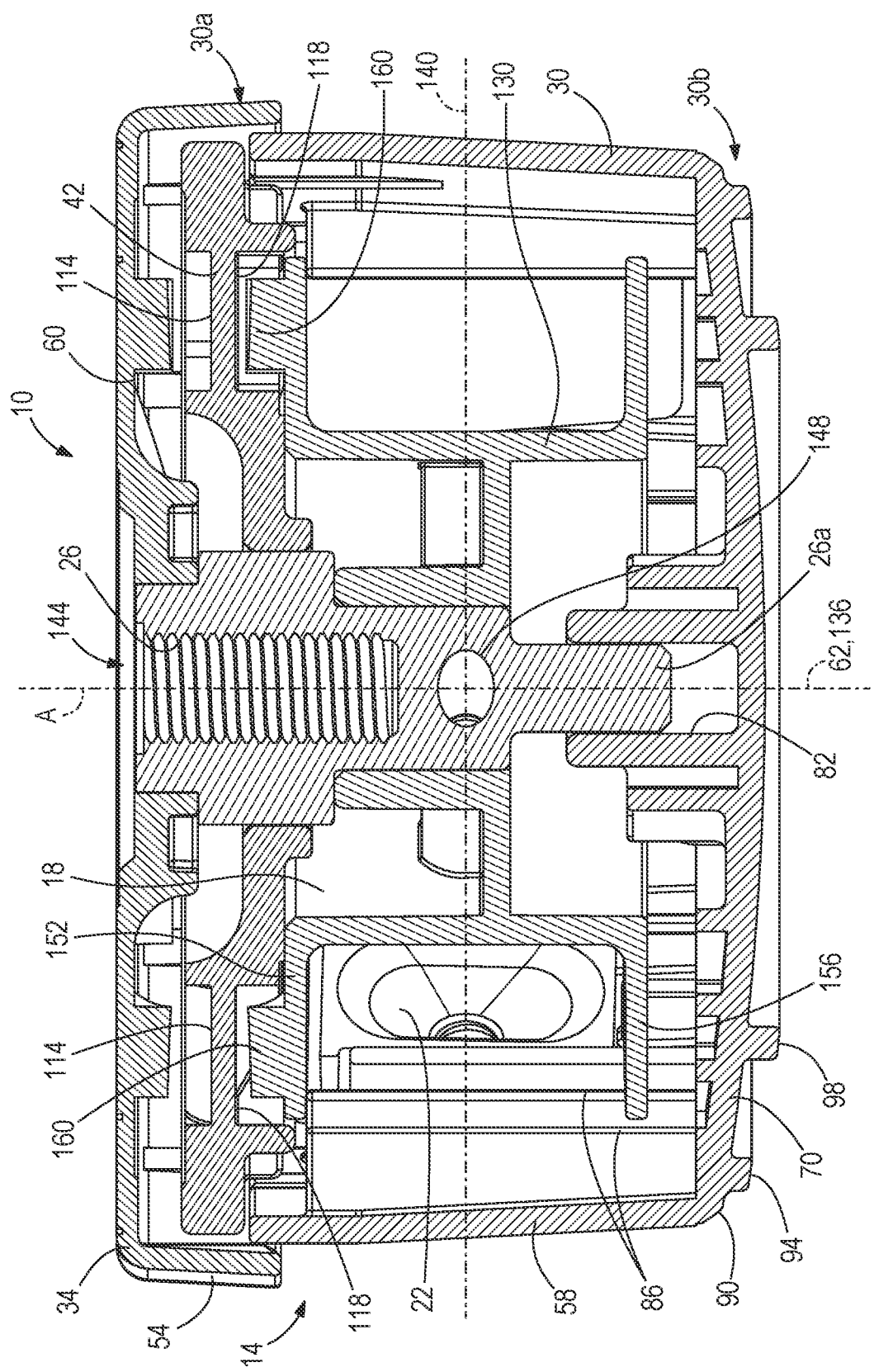
FIG. 3 is a cross-sectional view of the trimmer head of FIG. 2.
Figure 4:
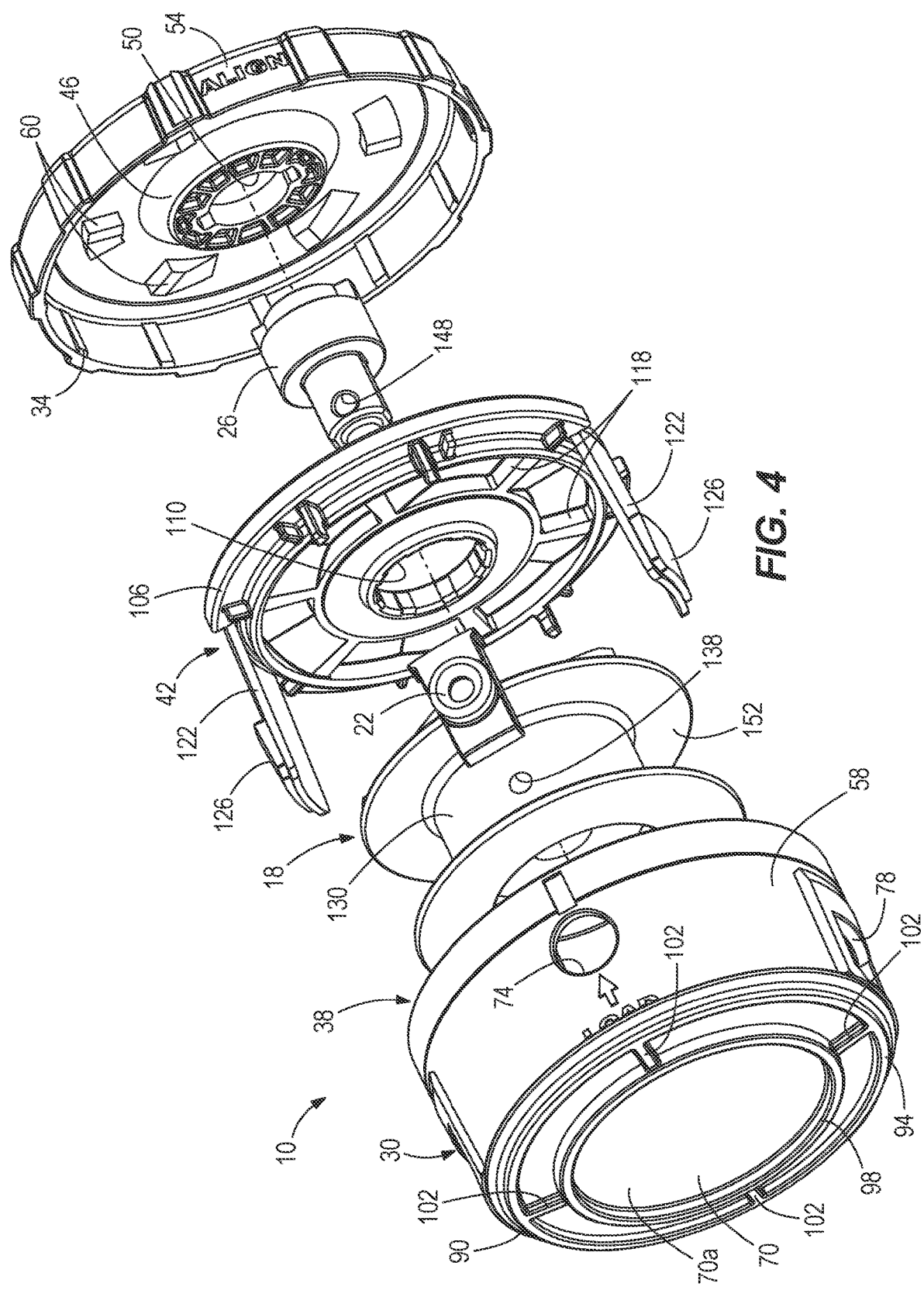
FIG. 4 is an exploded perspective view of the trimmer head of FIG. 2.

FIGS. 2-4 illustrate a string trimmer head 10 for use on an exemplary string trimmer 1 (FIG. 1). Such a trimmer 1 generally includes a shaft 2 with a handle 4 toward one end and a motor housing 6 enclosing an electric motor 8 with a motor-driven output, or drive shaft, 5 for connection to a trimmer head 10 on the other end. Various powered trimmers (e.g., battery-powered, gas-powered, etc.) may be used with the trimmer head 10.

As shown in FIGS. 2-4, the illustrated trimmer head 10 includes a housing 14 rotatable about an axis A and a spool 18 for retaining one or more lines. Line is wound around the spool 18 and extends through opposed eyelets 22 to cut vegetation (e.g., grass, weeds, etc.). in the illustrated embodiment, the trimmer head 10 is mounted to the trimmer drive shaft 5 via the spool 18. In other words, the spool 18 is drivingly connected to the drive shaft. In particular, a nut 26 configured to be drivingly connected to the drive shaft may be insert molded into the spool 18.

The housing 14 includes a main body 30 and a top plate or cap 34. The top plate 34 is spaced above the spool 18 and is keyed to the insert molded nut 26. The spool 18 and the top plate 34 are thus fixed to one other rotatably and axially via the insert molded nut 26. The main body 30 defines a cavity 38 for receiving the spool 18. A retainer ring 42 is positioned at the upper end of the main body 30. The retainer ring 42 is located on the insert molded nut 26 and is captured with axial and rotational play between the top plate 34 and an upper end of the spool 18. A spring (not shown) is located at a lower end of the spool 18 to bias against a lower end of the housing 14.

In the illustrated embodiment, the top plate 34 is generally cylindrical and includes a center boss 46 having an aperture 50 extending through the boss 46. The aperture 50 is shaped and sized to fixedly receive the insert molded nut 26. An outer rim 54 of the top plate 34 covers an end of a sidewall 58 of the main body 30 to enclose the cavity 38. A series of teeth 60 are positioned on an inner surface of the top plate 34 and are engageable with a corresponding series of teeth positioned on the retainer 42.

The main body 30 is generally cylindrical and includes a first end 30*a*, a second end 30*b* opposite the first end 30*a*, and a longitudinal axis 62 extending from the first end 30*a* to the second end 30*b*. The longitudinal axis 62 is collinear to the rotational axis A. The main body 30 additionally includes the sidewall 58 and a base wall 70. The sidewall 58 defines a pair of eyelet openings 74 and a pair of retainer openings 78. The eyelet openings 74 are shaped and sized to receive the eyelets 22, and the retainer openings 78 are shaped and sized to receive at least a portion of the retainer 42. An inner surface of the base wall 70 includes a center boss 82 and one or more ribs 86. The center boss 82 is shaped and sized to receive a portion of the insert molded nut 26. The ribs 86 axially extend from the base wall 70 and are configured to interface with the spool 18.

Figure 5:
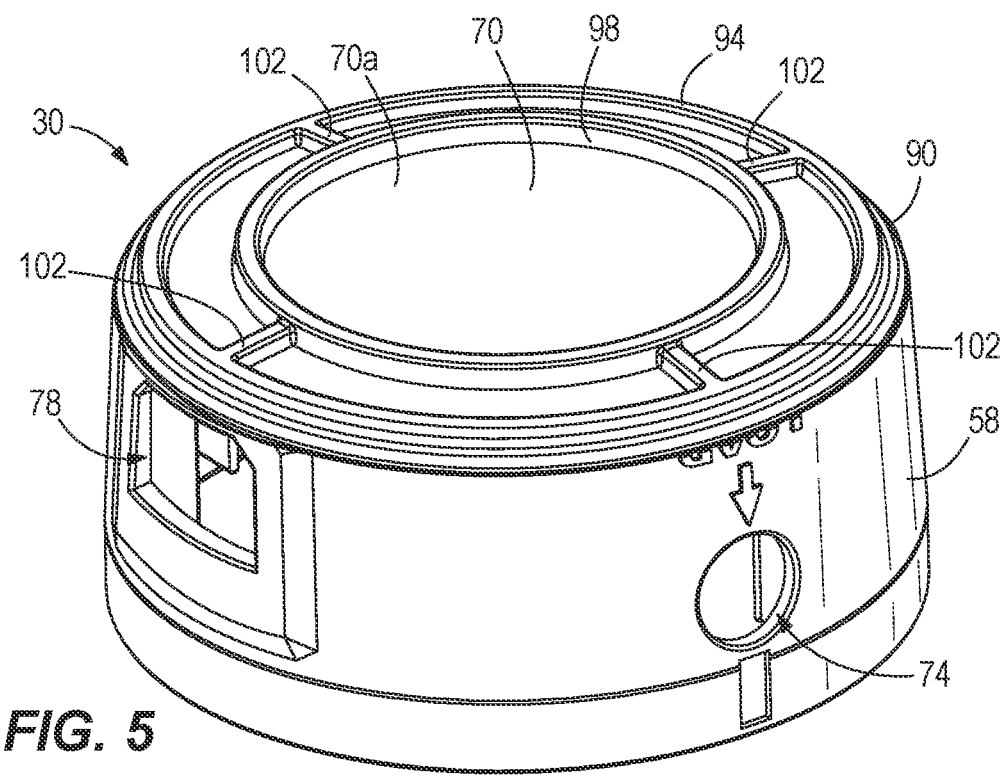
FIG. 5 is a perspective view of a housing of the trimmer head of FIG. 2.
Figure 6:
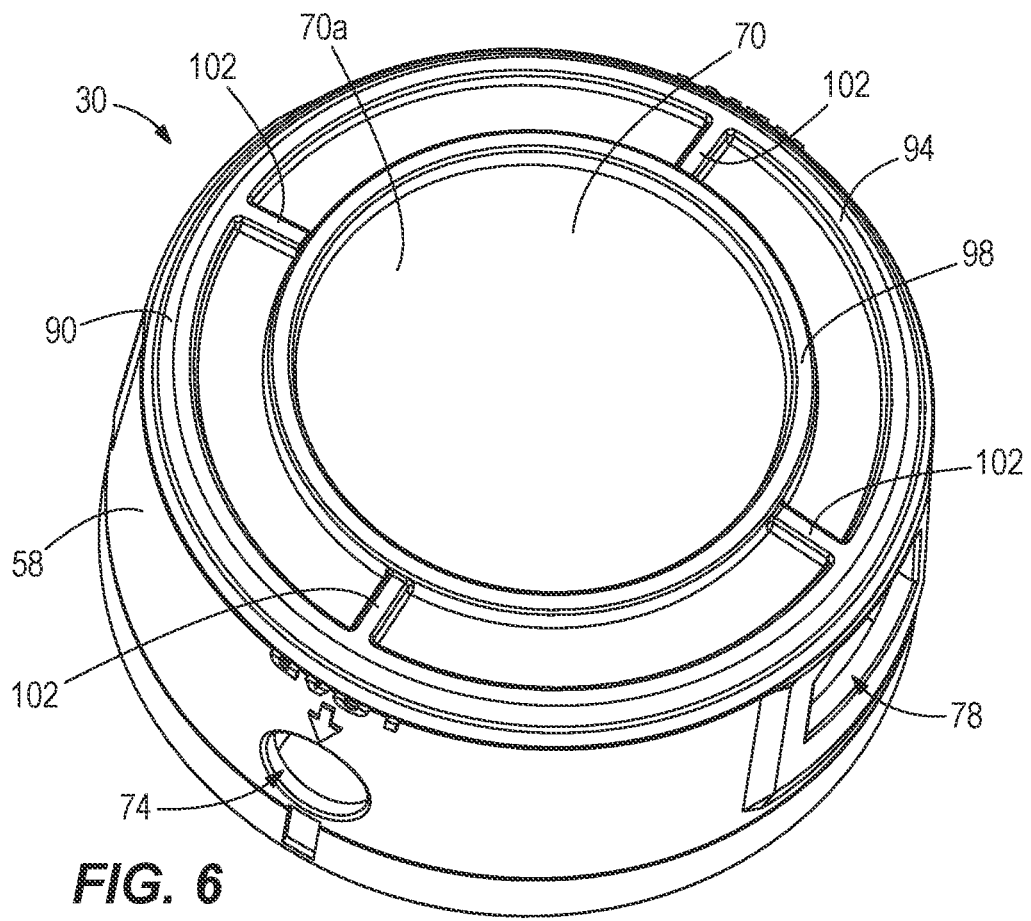
FIG. 6 is another perspective view of the housing of the trimmer head of FIG. 2.

With reference to FIGS. 4-6, an edge 90 is formed on an outer surface of the main body 30 at a junction between the sidewall 58 and the base wall 70. More specifically, the edge 90 is generally chamfered. In the illustrated embodiments, the edge 90 includes a 35-degree chamfer. However, in some embodiments, the edge 90 may include a chamfer of different sizes.

With continued reference to FIGS. 4-6, an outer surface 70*a* of the base wall 70 includes a first wear ring 94 and a second wear ring 98. The first and second wear rings 94, 98 are generally circular and protrude from the base wall 70. In the illustrated embodiments, the wear rings 94, 98 are integrally formed with the base wall 70. However, in alternative embodiments, the wear rings 94, 98 may be removably coupled to the base wall 70. In the illustrated embodiments, the first wear ring 94 includes a height of 2.2 mm and the second wear ring 98 includes a height of 3.1 mm. However, in some embodiments, the wear rings 94, 98 may include alternative heights. The wear rings 94, 98 are concentrically positioned on the base wall 70 relative to the longitudinal axis 62. More specifically, the first wear ring 94 includes a greater diameter than the second wear ring 98, such that the second wear ring 98 is positioned within the first wear ring 94. In the illustrated embodiment, the first wear ring 94 includes a diameter of approximately 91.9 mm and the second wear ring 98 includes a diameter of approximately 68.0 mm. However, in some embodiments, the wear rings 94, 98 may include alternative diameters. In the illustrated embodiments, the wear rings 94, 98 include a thickness of 3.0 mm. However, in some embodiments the wear rings 94, 98 may include alternative thicknesses.

In some embodiments, the wear ring(s) 94, 98 may include alternative shapes. For example, in some embodiments, at least one of the wear rings 94, 98 may include a rectangular shape. In such instances, the wear ring(s) 94, 98 may mate with a corresponding aperture and/or groove in a winding tool. More specifically, the winding tool may include a rectangular groove shaped and sized to receive at least one of the rectangular wear rings 94, 98. In order to turn the housing 14 (e.g., to wind line through the trimmer head 10), the user aligns the winding tool adjacent to the base wall 70 such that the wear rings(s) 94, 98 are positioned within the groove(s). Then, the user manually turns the tool relative to the trimmer head 10. As a result, because the wear ring(s) 94, 98 are engaged with the groove(s), the housing 14 turns in a direction opposite to a feed direction relative to the top plate 34, thereby winding line through the trimmer head 10 and onto the spool 18.

The outer surface 70*a* of the base wall 70 additionally includes ribs 102 protruding from the main body 30. The ribs 102 are positioned between the first wear ring 94 and the second wear ring 98 and are equidistantly spaced around the base wall 70 about the longitudinal axis 62. In the illustrated embodiments, the main body 30 includes four ribs 102. However, in alternative embodiments, the main body 30 may include fewer or additional ribs. The ribs 102 include a thickness equal to the thickness of the wear rings 94, 98.

As a user operates the string trimmer 1, the trimmer head 10 may be bumped against a work surface. However, the angle at which the trimmer head 10 is oriented relative to the work surface as it is "bumped" depends on the height of the user. For example, typically the base wall 70 of the trimmer head 10 is oriented within a range of 0-45 degrees relative to the work surface as it is being "bumped." The wear rings 94, 98 and chamfered edge 90 prevent damage to the housing 14 of the trimmer head 10, regardless of the angle at which the base wall 70 is oriented relative to the work surface. Because the wear rings 94, 98 protrude from the main body 30, as the trimmer head 10 is bumped against the ground, the wear rings 94, 98 contact the work surface rather than the sidewall 58 or base wall 70. As such, the housing 14 is prevented from undergoing wear.

Figure 7C:
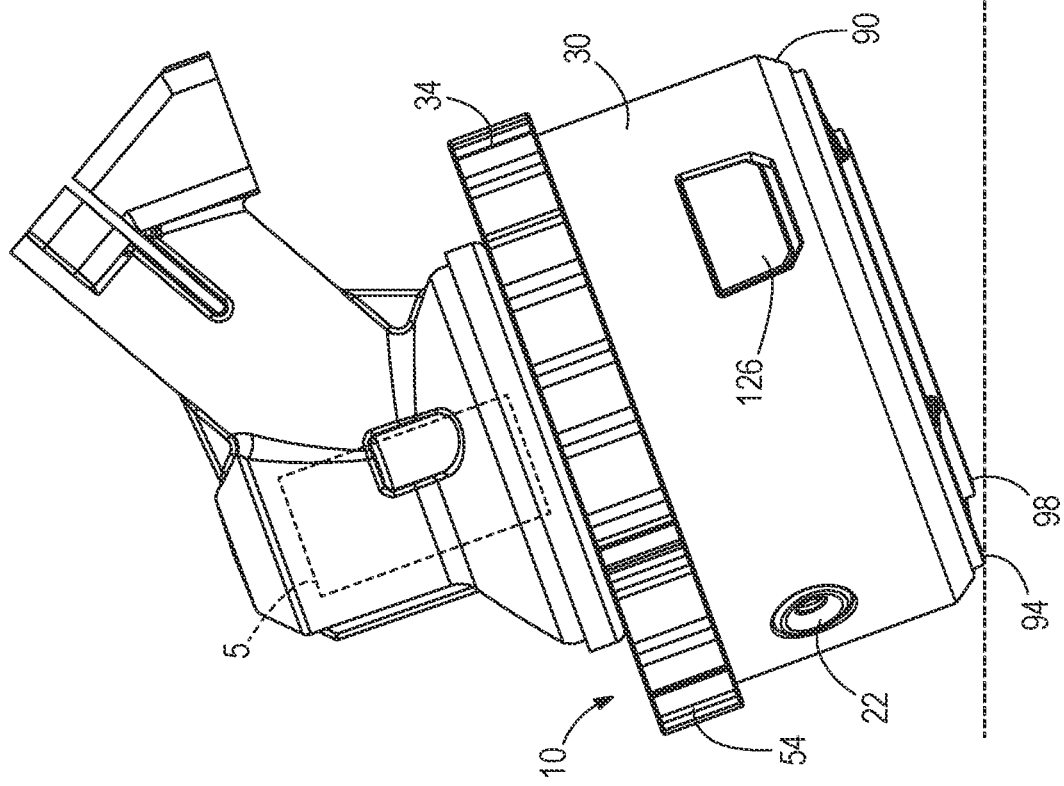
Figure 7D:
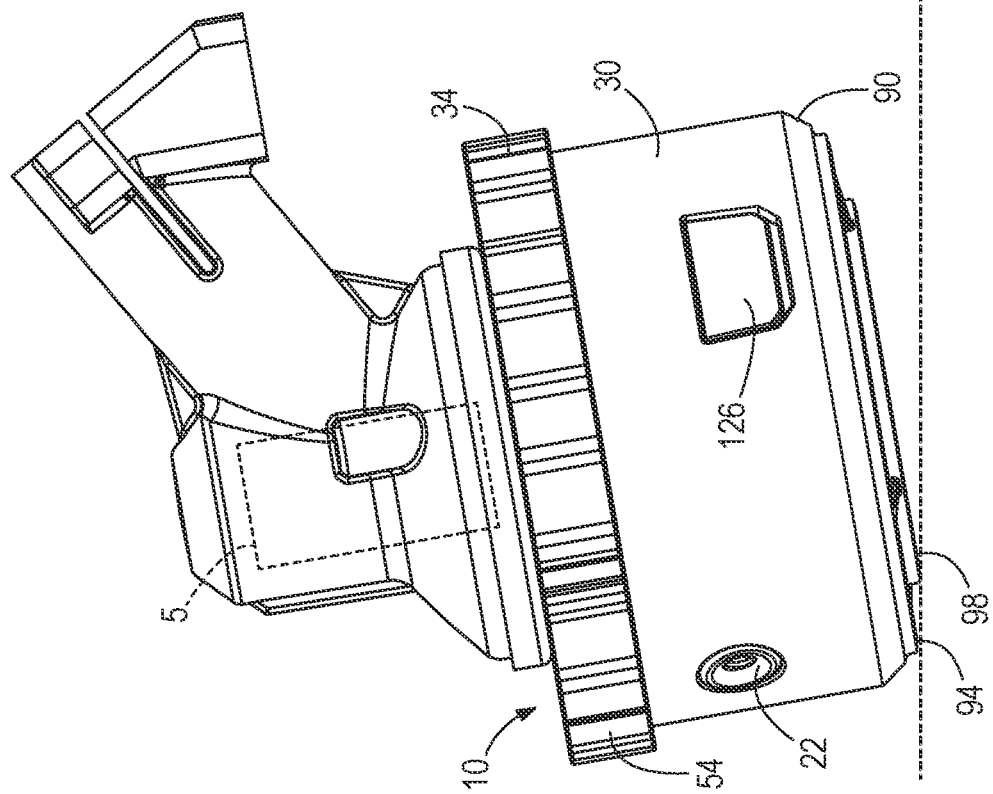
Figure 7F:
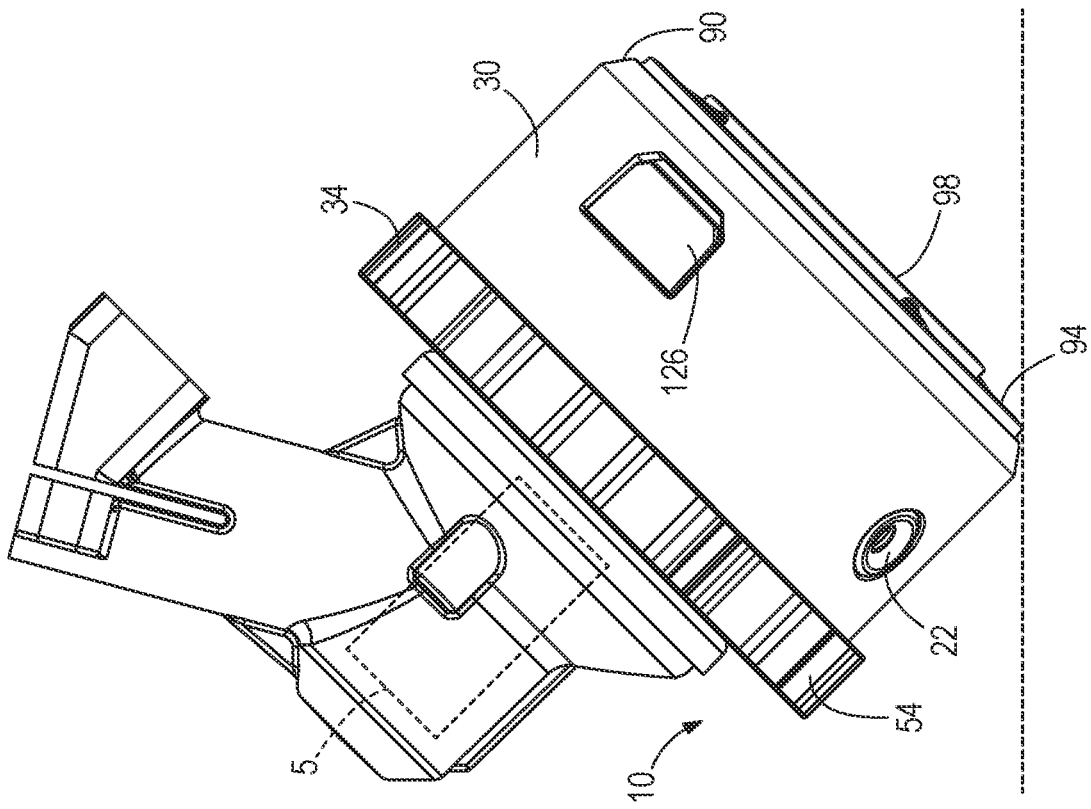
Figure 7E:
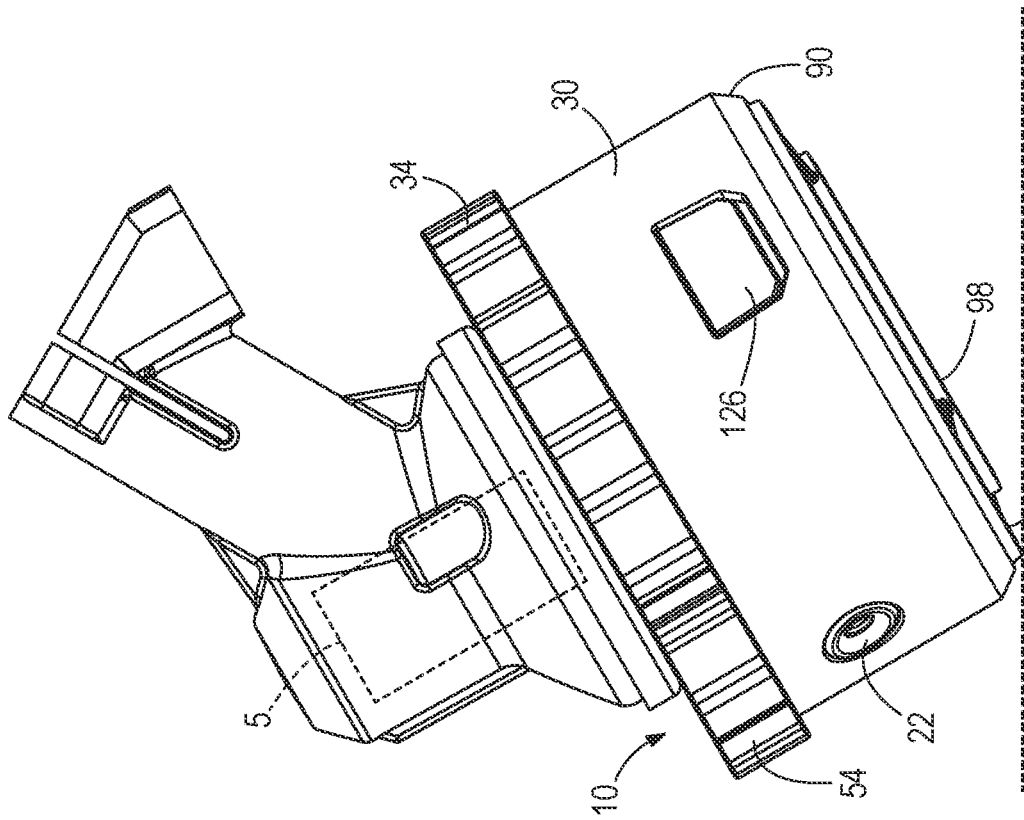
Figure 8:
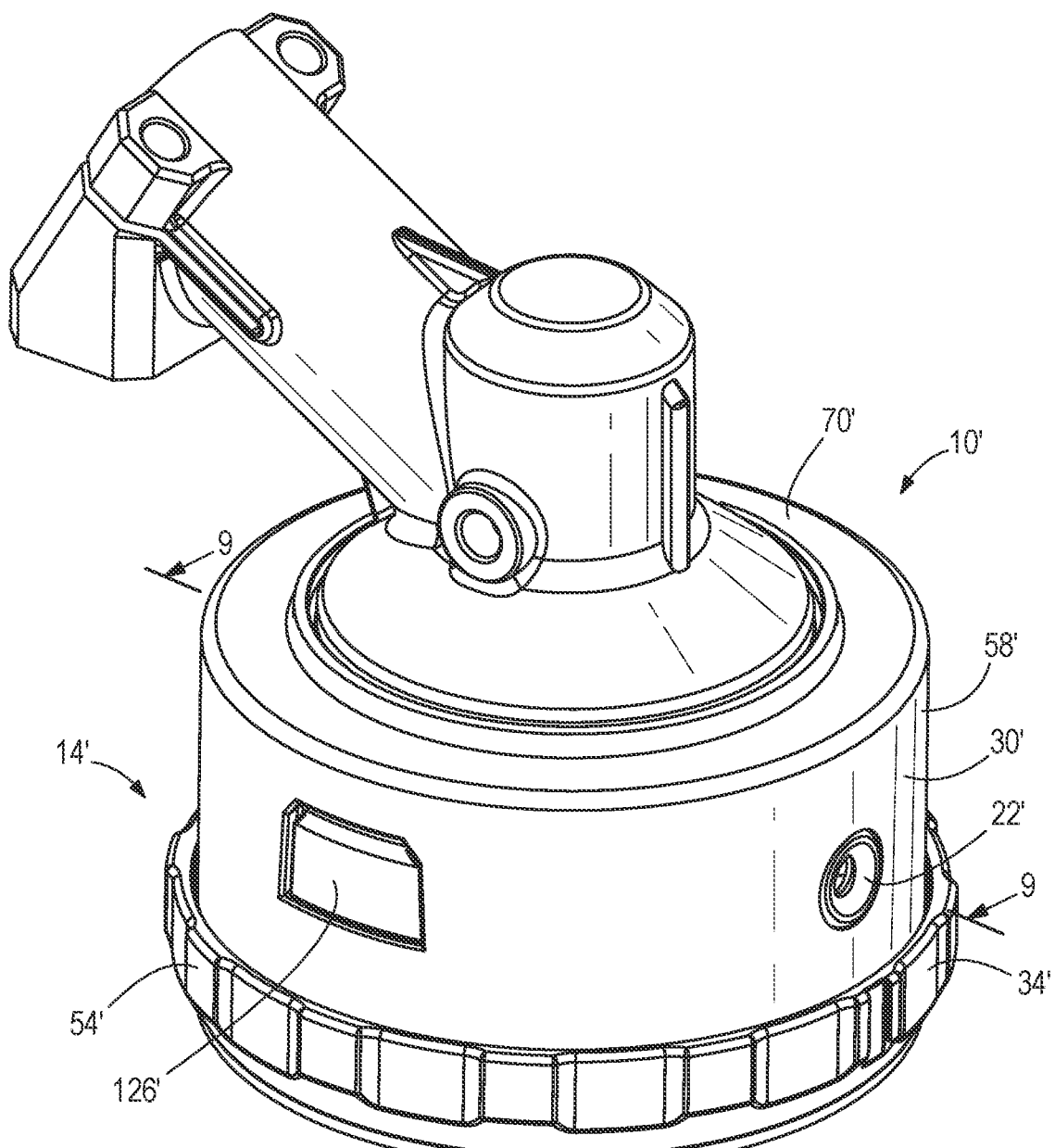
FIG. 8 is a perspective view of an alternative trimmer head, according to embodiments disclosed herein.

FIGS. 7A-7F illustrate the trimmer head 10 being bumped against the work surface at various angles. With reference to FIG. 7A, when the trimmer head 10 is bumped against the work surface when the base wall 70 is angled 0-degrees angle relative to the work surface, the wear rings 94, 98 contact the work surface, thereby preventing the base wall 70 from contacting the work surface and potentially undergoing damage. Because the second wear ring 98 has a larger height than the first wear ring 94, only the second wear ring 98 contacts the work surface. With reference to FIG. 7F, when the trimmer head 10 is bumped against the work surface when the base wall 70 is angled 45-degrees relative to the work surface, the chamfered edge 90 contacts the work surface, thereby preventing the sidewall 58 and/or base wall 70 from contacting the ground and potentially undergoing damage. FIGS. 7B-7E illustrate the trimmer head 10 being bumped against the work surface when the base wall 70 is angled within a range of 0-degrees and 45-degrees relative to the work surface. In such instances, at least one of the wear rings 94, 98 and/or the chamfered edge 90 contact the work surface.

With reference to FIGS. 3-4, the retainer 46 includes a ring 106 defining a central opening 110. The retainer 42 includes a first series of teeth 114 positioned on an upper surface of the ring 106, and a second series of teeth 118 positioned on a lower surface of the ring 106. The first series of teeth 114 are engageable with the teeth 60 positioned on the top plate 34 of the housing 14. Flexible retainer arms 122 extend from the ring 106, each having a retainer member 126 engageable in the associated retainer openings 78 to connect the main body 30 and the retainer 42.

With reference to FIGS. 3-4, the spool 18 includes a generally cylindrical, central body 130 including a through bore extending through the spool 18 along an axis 136 generally collinear to the longitudinal axis 62. An aperture 138 extends through the central body 130 for receiving line, such that the aperture 138 extends along an axis 140 substantially perpendicular to the longitudinal axis 62.

The through bore is shaped and sized to receive the insert molded nut 26. The insert molded nut 26 is positioned within the through bore and includes a threaded opening 144 shaped and sized to receive the shaft 5 of the string trimmer 1. In order to couple the trimmer head 10 to the shaft 5, the nut 26 is tightened around the drive shaft 5. A distal end 26a (FIG. 3) of the insert molded nut 26 protrudes through the spool 18 and is received within the central boss 82 of the main body 30 of the housing 14. The insert molded nut 26 additionally includes an aperture 148 that extends through the insert molded nut 26 along an axis generally perpendicular to the longitudinal axis 62. Specifically, the aperture 148 of the insert molded nut 26 aligns with the aperture 138 of the spool 18, thereby forming a passageway for line to be fed through the housing 14, the spool 18, and the insert molded nut 26.

The central body 130 of the spool 18 includes a first, upper flange 152 and a second, lower flange 156. The first and second flanges 152, 156 are arranged in parallel planes. In some embodiments, the spool 18 may include additional flanges. Teeth 160 are formed on the upper flange 152 and are selectively engageable with the second series of teeth 118 on the retainer 42.

A spring is located at the lower end of the spool 18 to bias against the housing 14. In the biased position, the retainer 42 and housing 14 are biased downwardly by the spring and the spool 18 is drivingly connected to the housing 14 via the second series of teeth 118 located on the lower surface of the retainer 42 cooperating with the teeth 160 on the upper flange 152 of the spool 18.

To install line, an end of a single line is fed through the passageway in one eyelet 22, into and through the aperture 138 of the spool 18 and the aperture 148 of the nut 26. The end of the line is then fed through the passageway in the other eyelet 22, such that an equal amount of line extends from each eyelet 22. The line is centered and then wound onto the spool 18 (e.g., by turning the housing 14 in a direction opposite to a feed direction while holding the top plate 34) until sufficient line extends from each eyelet 22.

In operation, the trimmer 1 is operated to rotate the drive shaft 5 and, thereby, the spool 18. As mentioned above, in the biased, initial position, the housing 14 and the retainer 42 are biased downwardly via the biasing spring, and the spool 18 is drivingly connected to the housing 14 via the plurality of cooperating teeth 118, 160 located on the retainer 42 and the top end of the spool 18. As a result, the trimmer 1 can be operated to rotate the drive shaft 5, thereby rotating the spool 18 (along with the housing 14 and the retainer 42) and the cutting line so that the line may cut vegetation.

As the trimmer head 10 is being operated, the head 10 may be "bumped" against the work surface, for example, to dispense additional cutting line.

The housing 14 and the retainer 42 move axially on the insert molded nut 26 against the spring bias to disengage the cooperating interfaces (e.g., teeth 160, 118) on the top of the spool 18 and the bottom of the retainer 42. With these cooperating interfaces 160, 118 disengaged, the housing 14 is free to rotate relative to the spool 18 so as to dispense additional line. The housing 14 may be depressed until the retainer 42 engages the top plate 34. At this time, a plurality of cooperating interfaces (e.g., ramps, or teeth, 114 formed on the bottom of the top plate 34 and ramps, or teeth, 60 formed on the top of the retainer 42) engage with one another so as to momentarily drivingly connect the housing 14 with the spool 18. Once the housing 14 disengages the surface, the spring biases the housing 14 and the retainer 42 downwardly into the biased position. As the cooperating interfaces 114, 60 on the bottom of the top plate 34 and the top of the retainer 42 are disengaged, the housing 14 is again free to rotate relative to the spool 18 so as to dispense additional line until the cooperating interfaces 160, 118 on the top of the spool 18 and the bottom of the retainer 42 become engaged in the biased position.

Because the wear rings 94, 98 are positioned on the bottom of the base wall 70 of the main body 30, the wear rings 94, 98 contact the work surface rather than the base wall 70. Therefore, the housing 14 is protected from wear against the ground. In the event that the user bumps the trimmer head 10 against the ground at an angle (e.g., the base wall 70 is oriented at an angle relative to the work surface), the chamfered edge 90 of the main body 30 contacts the work surface rather than the sidewall 58 and/or the base wall 70, thereby protecting the housing 14 from wear.

FIGS. 8-13F illustrate an alternative trimmer head 10'. The illustrated trimmer head 10' is similar to the trimmer head 10 described above and includes like parts. Reference is hereby made to the description of the trimmer head 10 shown in FIGS. 2-7F for description of features and elements of the trimer head 10' not specifically included below. The trimmer head 10' is mounted to the string trimmer shaft via a housing, rather than via the spool, which will be described below. Components that are similar to those described in the trimmer head 10 have the same reference number plus an apostrophe.

The illustrated trimmer head 10' includes a body 14' rotatable about an axis A' and supporting a spool 18' for retaining one or more lines. Line is wound around the spool 18' and extends through opposed eyelets 22' to cut vegetation (e.g., grass, weeds, etc.) The housing 14' includes a main body 30' drivingly connectable to the trimmer drive shaft 5 and a bottom plate 34' coupled to the spool 18'. The main body 30' and the bottom plate 34' cooperate to define a cavity 38' for the spool 18'. In the illustrated arrangement, the main body 30' and the bottom plate 34' are rotatably and axially fixed to the drive shaft 5. The housing is coupled to a retainer 42' so as to capture the spool 18' therebetween. The spool 18' is fixed to the bottom plate 34' such that the retainer 42' is captured therebetween. More specifically, the spool 18' and the bottom plate 34' are rotatably and axially fixed to each other and are movable relative to the main body 30' and the retainer 42'.

The main body 30' is generally cylindrical and includes a first end 30a', a second end 30b' opposite the first end 30a', and a longitudinal axis 62' extending from the first end 30a' to the second end 30b'. The main body 30' additionally includes a sidewall 58' and a base wall 70'. The sidewall 58' defines a pair of eyelet openings 74' and a pair of retainer openings 78'. The eyelet openings 74' are shaped and sized to receive the eyelets 22', and the retainer openings 78' are shaped and sized to receive at least a portion of the retainer 42'. The base wall 70' includes a center boss 82' having a connection member 84' for connection to the trimmer drive shaft 5. A series of teeth 88' (FIG. 9) are positioned on an inner surface of the base wall 70' and are engageable with a corresponding series of teeth on the spool 18'F.

Figure 9:
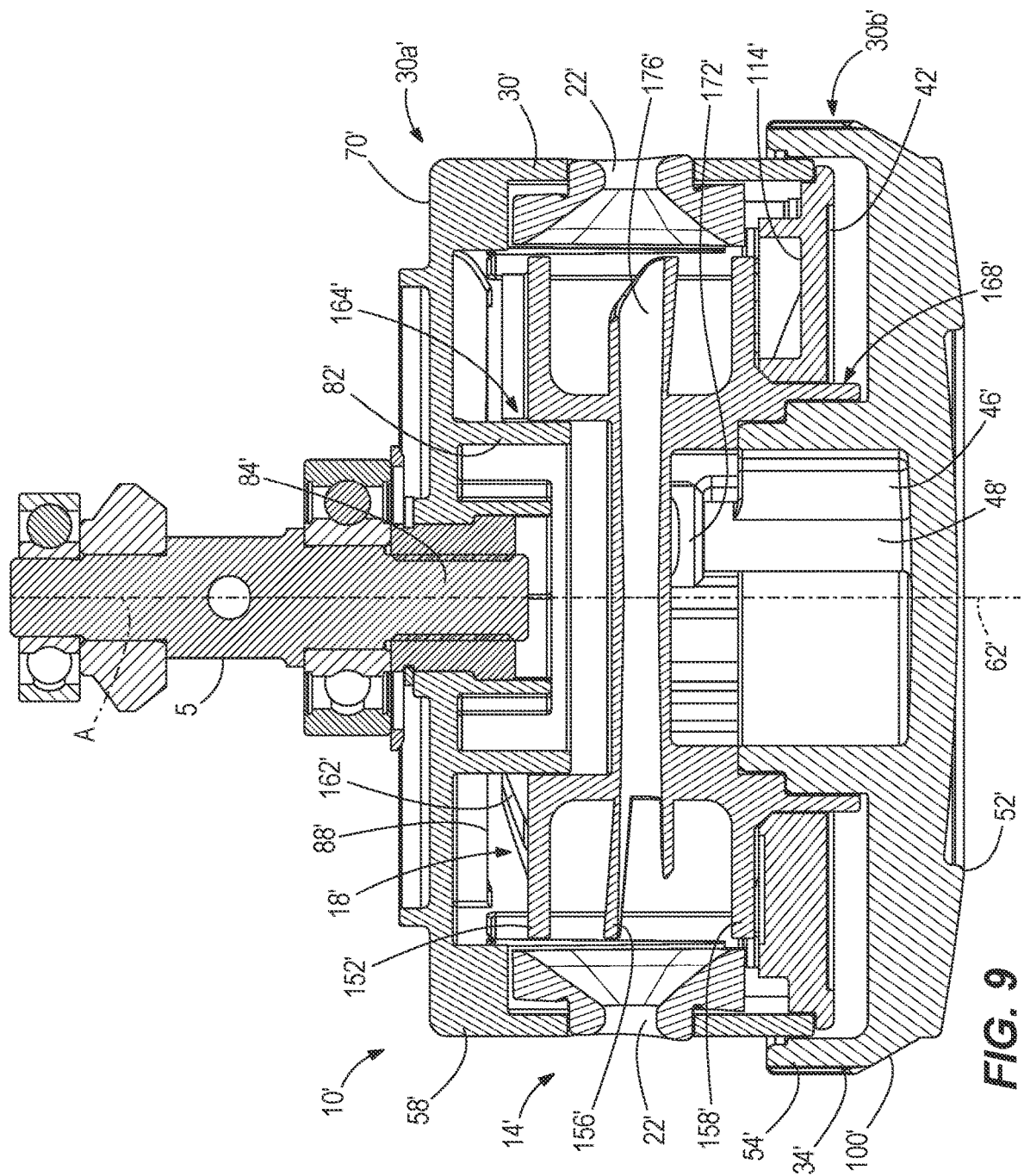
FIG. 9 is a cross-sectional view of the trimmer head of FIG. 8.
Figure 10:
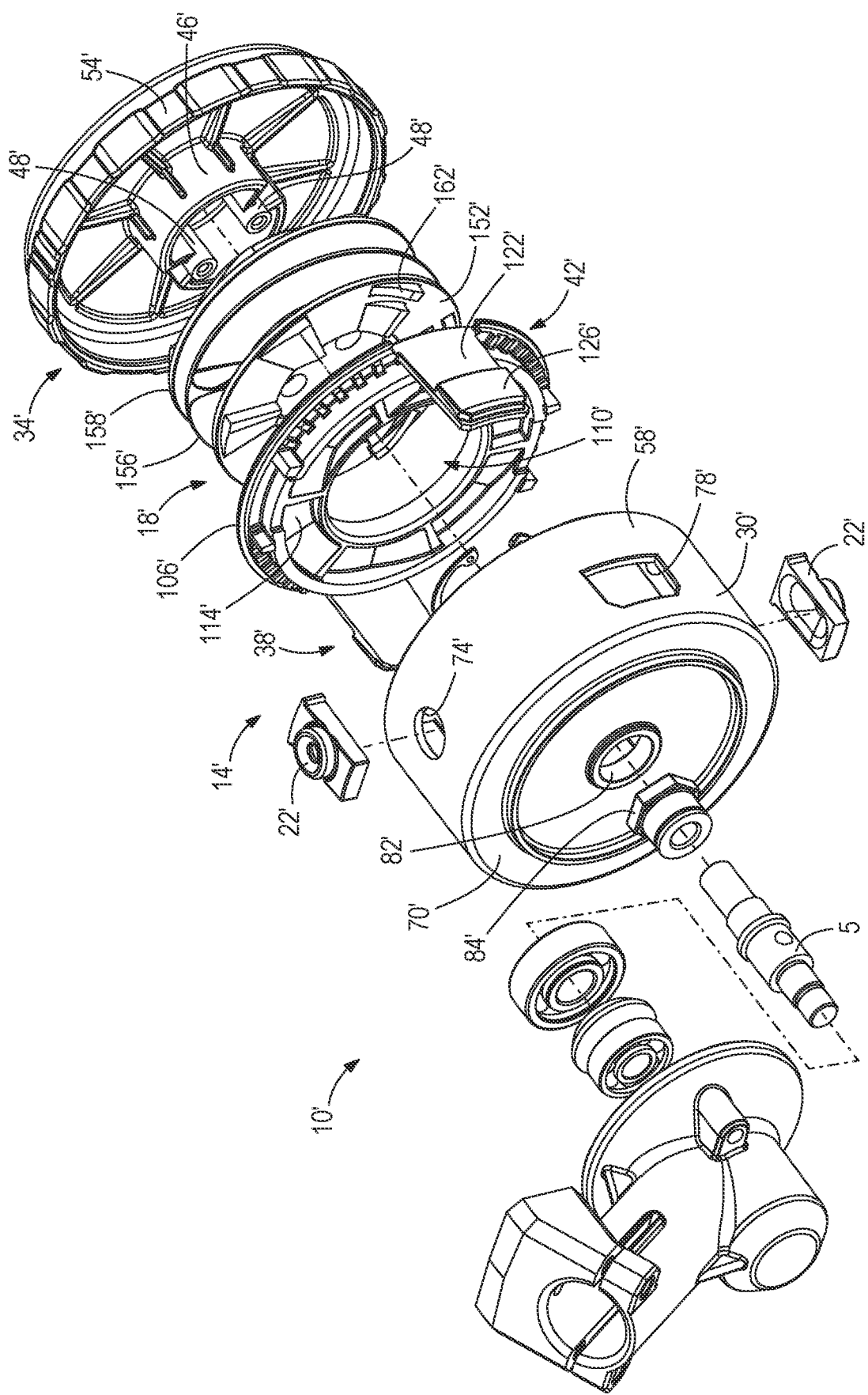
FIG. 10 is an exploded view of the trimmer head of FIG. 8.

With reference to FIGS. 9-10, the retainer 42' includes a ring 106' defining a central opening 110'. The retainer 42' includes a series of teeth 114' positioned on an upper surface of the ring 42'. The teeth 114' are engageable with corresponding teeth positioned on the spool 18'. Flexible retainer arms 122' extend from the ring 106', each having a retainer member 126' engageable in the associated retainer openings 78' to connect the main body 30' and the retainer 42'.

The bottom plate 34' is generally cylindrical and includes a center boss 46' with one or more connecting projections 48'. The bottom plate 34' includes an outer rim 54' and a main outer wall 52'. The outer rim 54' of the bottom plate 34' covers an end of the sidewall 58' of the main body 30' to enclose the cavity 38'.

Figure 11:
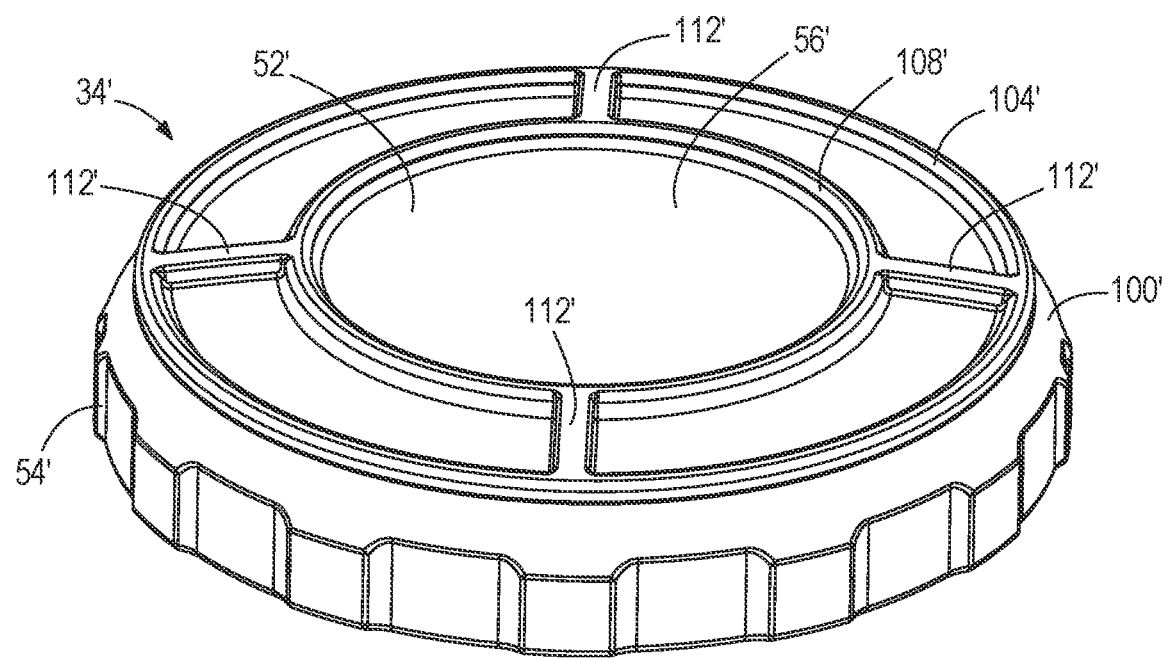
FIG. 11 is a perspective view of a housing cap of the trimmer head of FIG. 8.
Figure 12:
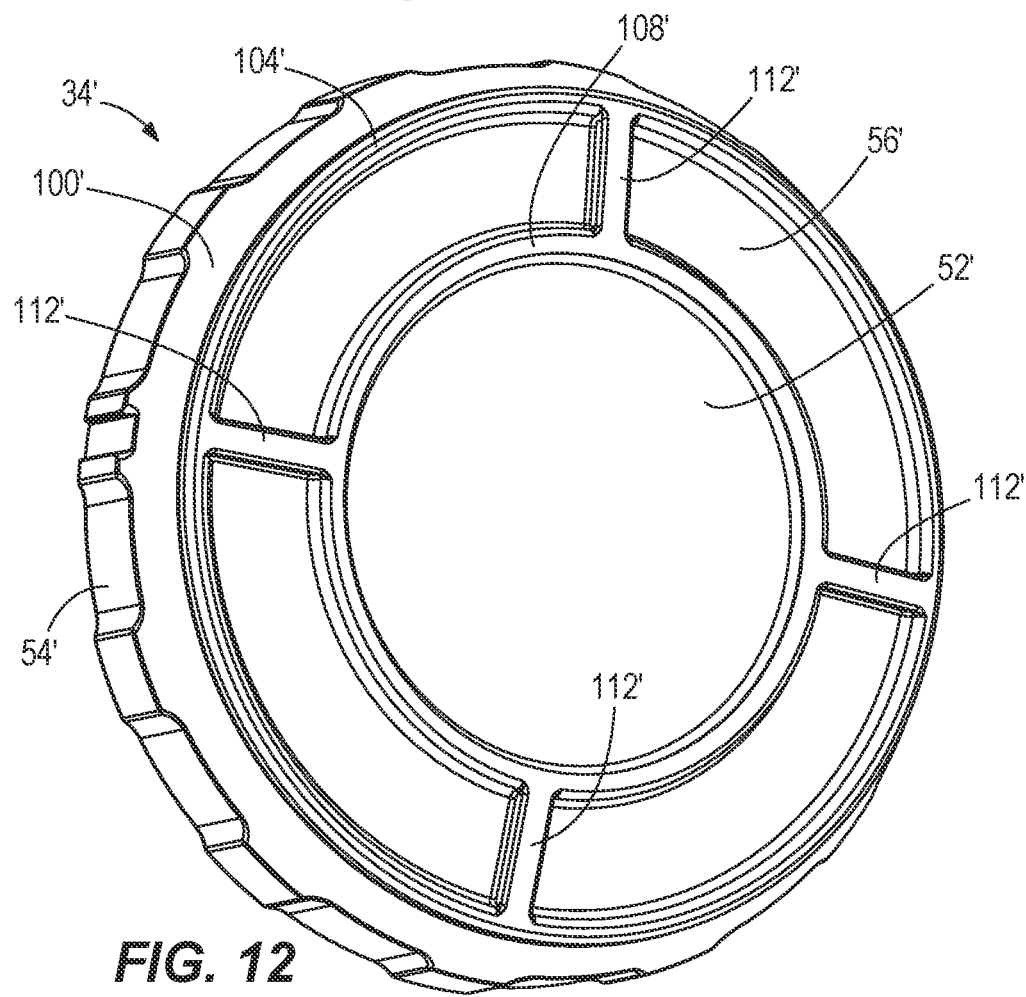
FIG. 12 is another perspective view of a housing cap of the trimmer head of FIG. 8.

With reference to FIGS. 10-12, an edge 100' is formed on an outer surface of the bottom plate 34' at a junction between the outer rim 54' and the main outer wall 52'. More specifically, the edge 100' is generally chamfered. In the illustrated embodiments, the edge 100' includes a 60-degree chamfer. However, in some embodiments, the edge 100' may include a chamfer of different sizes.

With continued reference to FIGS. 11-12, the main outer wall 52' includes a first wear ring 104' and a second wear ring 108'. The first and second wear rings 104', 108' are generally circular and protrude from the main outer wall 52'. In the illustrated embodiments, the wear rings 104', 108' are integrally formed with the main outer wall 52'. However, in alternative embodiments, the wear rings 104', 108' may be removably coupled to the main outer wall 52'. In the illustrated embodiments, the first and second wear rings 104', 108' include a height of 3.1 mm. However, in some embodiments, the wear rings 104', 108' may include alternative heights. The wear rings 104', 108' are concentrically positioned on the main outer wall 52' relative to the longitudinal axis 62'. More specifically, the first wear ring 104' includes a greater diameter than the second wear ring 108', such that the second wear ring 108' is positioned within the first wear ring 104'. In the illustrated embodiment, the first wear ring 104' includes a diameter of approximately 102.0 mm and the second wear ring 108' includes a diameter of approximately 68.0 mm. However, in some embodiments, the wear rings 104', 108' may include alternative diameters. In the illustrated embodiments, the wear rings 104', 108' include a thickness of 3.0 mm. However, in some embodiments the wear rings 104', 108' may include alternative thicknesses.

The bottom plate 34' additionally includes ribs 112' protruding from the main outer wall 52'. The ribs 112' are positioned between the first wear ring 104' and the second wear ring 108' and are equidistantly spaced around the main outer wall 52' about the longitudinal axis 62'. In the illustrated embodiments, the bottom plate 34' includes four ribs 112'. However, in alternative embodiments, the bottom plate 34' may include fewer or additional ribs. The ribs 112' include a thickness equal to the thickness of the wear rings 104', 108'.

As a user operates the string trimmer 1, the trimmer head 10' may be bumped against a work surface. However, the angle at which the trimmer head is oriented relative to the work surface as it is "bumped" depends on the height of the user. For example, typically the main outer wall 52' is oriented within a range of 0-45 degrees relative to the work surface as it is bumped against the work surface. The wear rings 104', 108' and chamfered edge 100' prevent damage to the housing 14' of the trimmer head 10', regardless of the angle at which the main outer wall 52' is oriented relative to the work surface. Because the wear rings 104', 108' protrude from the main outer wall 52', as the trimmer head 10' is bumped against the ground, the wear rings 104', 108' contact the work surface rather than the outer rim 54' or main outer wall 52'. As such, the bottom plate 34' is prevented from undergoing wear.

Figure 13F:
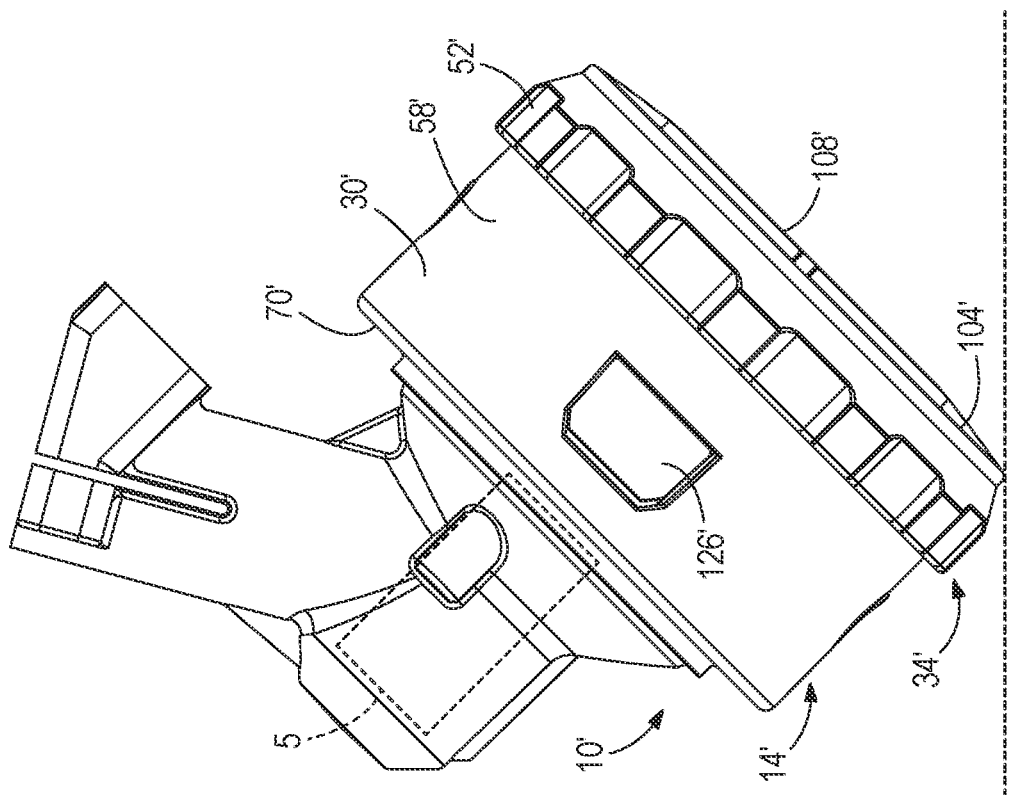
Figure 13E:
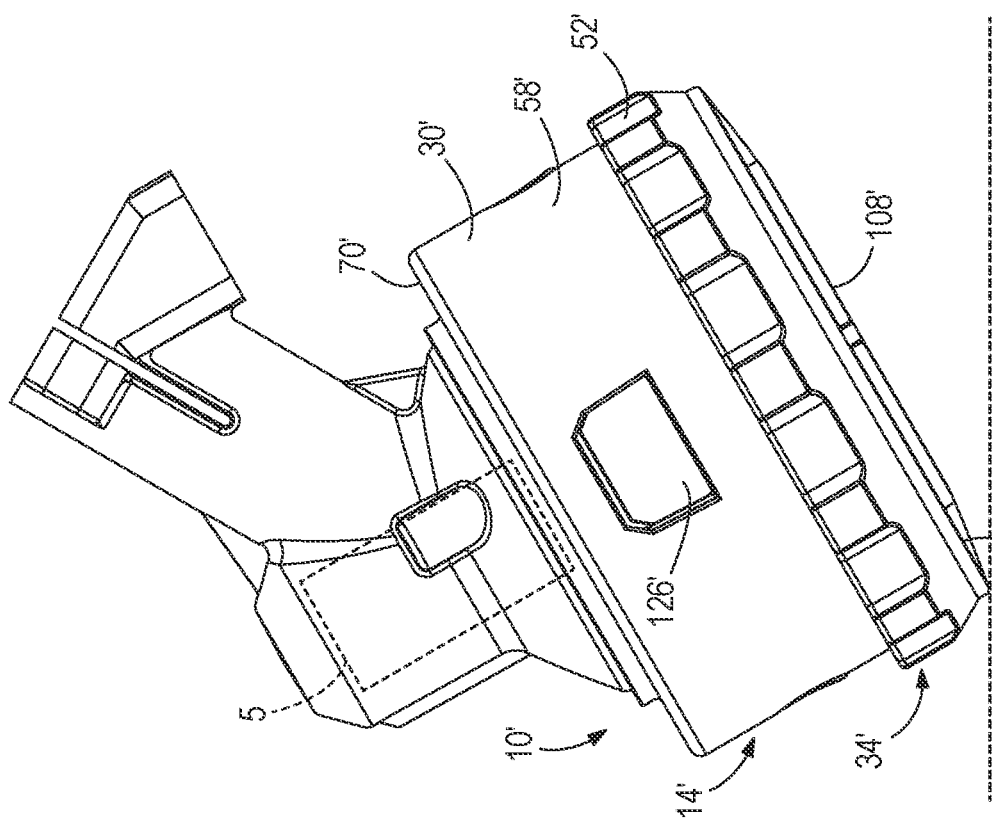

FIGS. 13A-13F illustrate the trimmer head 10' being bumped against the work surface at various angles. With reference to FIG. 13A, when the trimmer head 10' is bumped against the work surface when the main outer wall 52' is angled 0-degrees angle relative to the work surface, the wear rings 104', 108' contact the work surface, thereby preventing the main outer wall 52' from contacting the work surface and potentially undergoing damage. With reference to FIG. 13F, when the trimmer head 10' is bumped against the work surface when the main outer wall 52' is angled 45-degrees relative to the work surface, the chamfered edge 100' contacts the work surface, thereby preventing the outer rim 54' and/or main outer wall 52' from contacting the ground and potentially undergoing damage. FIGS. 13B-13E illustrate the trimmer head 10' being bumped against the work surface when the main outer wall 52' is angled within a range of 0-degrees and 45-degrees relative to the work surface. In such instances, at least one of the wear rings 104', 108' and/or the chamfered edge 100' contact the work surface.

With reference to FIG. 9, the spool 18' includes a central body 130' having an upper recess 164' and a lower recess 168'. The upper recess 164' slidingly receives the center boss 82' of the main body 30' and a biasing spring (not shown). The biasing spring is operable to bias the spool 18' downwardly away from the main body 30' to an initial position. The lower recess 168' includes a receptacle member 172' shaped and sized to interface with the connecting projections 48' of the bottom plate 34', thereby coupling the spool 18' to the bottom plate 34'.

The spool 18' also includes a first, upper flange 152' extending around the upper recess 164', a second, lower flange 156' spaced apart from the lower recess 168', and a third, intermediate flange 158' dividing the cavity 38' into upper and lower line receptacles. A first series of teeth 160' are formed on the upper flange 152' and are selectively engageable with the teeth 88' on the main body 30', and a second series of teeth 162' are formed on the lower flange 156' and are selectively engageable with the teeth 114' on the retainer 42'. In the biased, initial position of the spool 18', the second series of teeth 162' engage the retainer teeth 114' to drivingly connect the spool 18' (and the bottom plate 34') with the retainer 42' (and the main body 30' and the trimmer drive shaft 5). The intermediate flange 158' defines a tube 176' for receiving the line. The tube 176' has oppositely-opposing radial ends opening into the upper and lower line receptacles, respectively.

To install line, the end of the single line is fed in one eyelet 22', into and through the tube 176'. The end of the line is then fed in the other eyelet 22', such that an equal amount of line extends from each eyelet 22'. The line is centered and then wound onto the spool 18' (e.g., by turning the bottom plate 34' in a direction opposite to a feed direction) until sufficient line extends from each eyelet 22'.

In operation, the trimmer 1 is operated to rotate the drive shaft 2 and, thereby, the main body 30' (along with the retainer 42'). In the biased, initial position, the second series of teeth 162' engage the retainer teeth 114' to drivingly connect the spool 18', and the bottom plate 34', with the retainer 42' (and with the main body 30' and the trimmer drive shaft 5). As a result, the spool 18' and the line are rotated so that the line cuts vegetation.

As the trimmer head 10' is being operated, the head 10' may be "bumped" against the work surface. Because the wear rings 104', 108' are positioned on the main outer wall 52' of the bottom plate 34', the wear rings 104', 108' contact the work surface rather than the main outer wall 52'. Therefore, the housing 14' is protected from wear against the ground. In the event that the user bumps the trimmer head 10' against the ground at an angle (e.g., the main outer wall 52' is oriented at an angle relative to the work surface), the chamfered edge 100' of the bottom plate 34' contacts the work surface rather than the outer rim 54' and/or the main outer wall 52', thereby protecting the housing 14' from wear.

Figure 14:
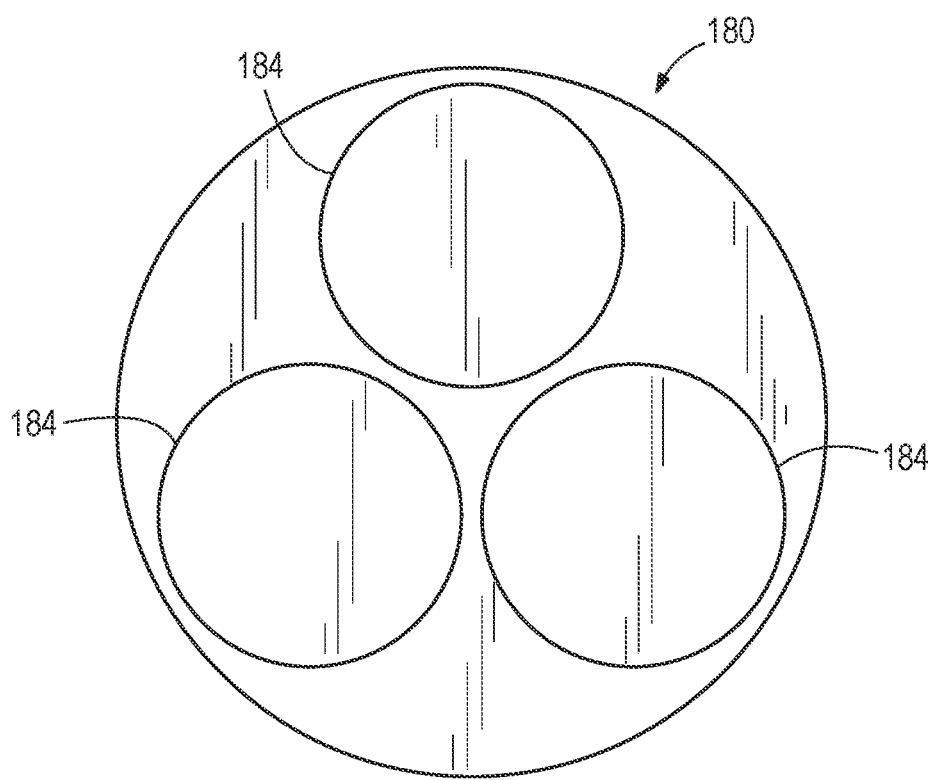
FIG. 14 is a side view of a wear attachment configured to couple to the trimmer head of FIG. 1 or the trimmer head of FIG. 8.

FIG. 14 illustrates a wear attachment 180 removably coupled to the string trimmer head 10 and/or the string trimmer head 10'. Specifically, the wear attachment 180 is configured to couple to the base wall 70 of the main body 30 of the trimmer head 10 and/or the main outer wall 52' of the bottom plate 34' of the trimmer head 10'.

The wear attachment includes various wear caps 184. Each of the wear caps 184 is circular and coupled to the main body 30 and/or the bottom plate 34' via one or more bearings. Specifically, each of the bearings couples the wear caps 184 to the trimmer head 10, 10' along an axis that is offset and parallel to the longitudinal axis 62, 62'. The wear caps 184 are configured to rotate about the axis relative to the main body 30 and/or the bottom plate 34'. Each of the bearings is positioned between the wear cap 184 and the main body 30 and/or the bottom plate 34'. Each of the bearings includes a screw and a washer. In the illustrated embodiment, the wear attachment 180 includes three wear caps 184. However, the wear attachment 180 may include fewer or additional wear caps 184. Additionally, the wear attachment 180 may include wear caps 184 of alternative shapes and sizes.

As the trimmer head 10, 10' is being operated, the head 10, 10' may be "bumped" against the work surface. When the head 10, 10' is bumped, the head 10, 10' rotates relative to the wear caps 184. Because the wear caps 184 are positioned on the base wall 70 of the main body 30 and/or main outer wall 52' of the bottom plate 34', the wear caps 184 contact the work surface rather than the base wall 70 or the main outer wall 52'. Therefore, the housing 14, 14' is protected from wear against the ground.

FIGS. 15A-15B illustrate a wear attachment 188 removably coupled to the string trimmer head 10 and/or the string trimmer head 10'. The wear attachment 188 includes a cover 192 and several balls 196. The cover 192 is a generally cylindrical plate configured to couple to the base wall 70 of the main body 30 of the trimmer head 10 and/or the main outer wall 52' of the bottom plate 34' of the trimmer head 10'.

The balls 196 are generally spherical and may be composed of a metal material (e.g., steel). With continued reference to FIGS. 15A-15B, the balls 196 are positioned within the cover 192. Specifically, as shown in FIG. 15B, the balls 196 are captured within and protrude through the cover 192. Each of the balls 196 is configured to rotate relative to the cover 192 and/or the trimmer head 10, 10'. In the illustrated embodiment, the wear attachment 188 includes eleven balls 196. However, the wear attachment 188 may include fewer or additional balls and/or balls of different shapes and sizes. Additionally, the balls 196 may be composed of alternative materials.

As the trimmer head 10, 10' is being operated, the head 10, 10' may be "bumped" against the work surface. When the head 10, 10' is being bumped, the head 10, 10' rotates relative to the cover 192. Additionally, the balls 192 rotate relative to the cover 192 and/or the trimmer head 10, 10'. Because the balls 192 protrude through the cover 192, the balls 192 contact the work surface rather than the base wall 70 of the main body 30 or the main outer wall 52' of the bottom plate 34'. Therefore, the housing 14, 14' is protected from wear against the ground.

FIGS. 16A-16B and 17A-17B illustrate a wear attachment 200 removably coupled to the string trimmer head 10 and/or the string trimmer head 10'. The wear attachment 200 includes a cover 204 and various rollers 208. The cover 204 is a generally cylindrical plate configured to couple to the base wall 70 of the main body 30 of the trimmer head 10 and/or the main outer wall 52' of the bottom plate 34' of the trimmer head 10'.

Figure 16B:
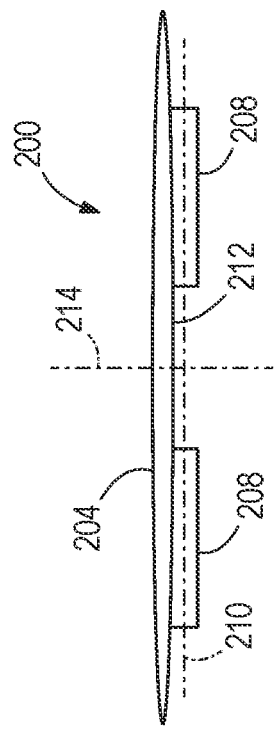
FIGS. 16A-16B are side views of another wear attachment configured to couple to the trimmer head of FIG. 1 or the trimmer head of FIG. 8.
Figure 16A:
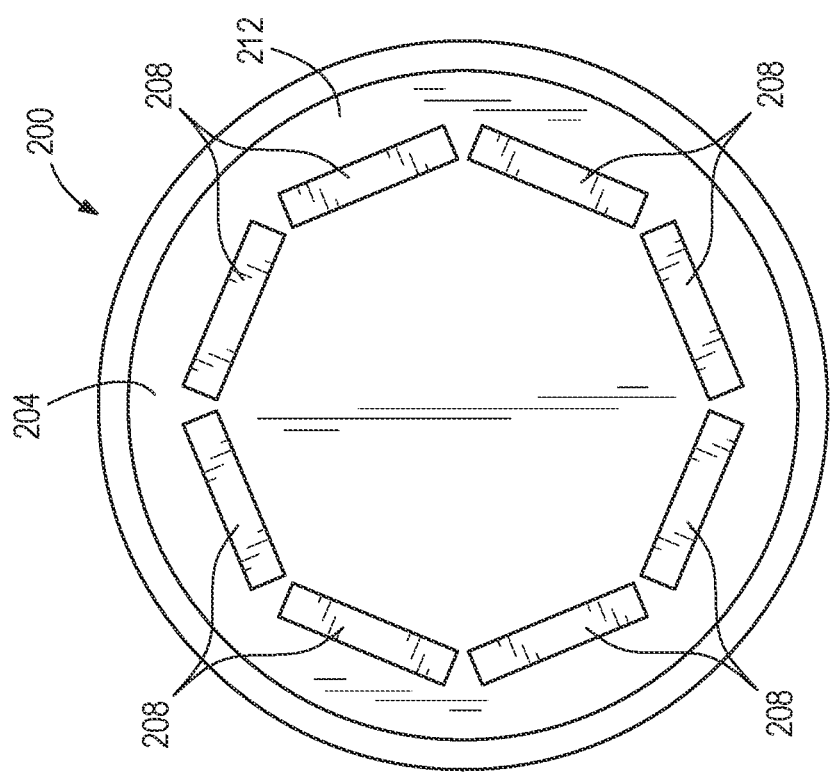

The rollers 208 are generally cylindrical and are composed of a metal material (e.g., steel). With continued reference to FIGS. 16A-16B and 17A-17B, the rollers 208 are coupled to the cover 204. Specifically, as shown in FIGS. 16B and 17B, the rollers 208 are coupled to an outer wall 212 of the cover 204 and are configured to engage a work surface. In some embodiments (FIGS. 16A-16B), each of the rollers 208 is positioned adjacent to each other, such that the rollers 208 form a continuous, circular shape relative to the cover 204. In other embodiments, (FIGS. 17A-17B), the rollers 208 are spaced apart from each other. Each of the rollers 208 is configured to rotate relative to the cover 204 and/or the trimmer head 10 about a roller axis 210, which is oriented perpendicular to an axis 214 of the wear attachment 200, 10'. In some embodiments (FIGS. 16A-16B), the wear attachment 200 includes eight rollers 208 and in alternate embodiments (FIGS. 17A-17B), the wear attachment 200 includes three rollers 208. However, the wear attachment 200 may include fewer or additional rollers and/or rollers of different shapes and sizes. Additionally, the rollers 208 may be composed of alternative materials.

As the trimmer head 10, 10' is being operated, the head 10, 10' may be "bumped" against the work surface. When the head 10, 10' is being bumped, the head 10, 10' rotates relative to the cover 204. Additionally, the rollers 208 rotate relative to the cover 204 and/or the trimmer head 10, 10' about the roller axis 210. Because the rollers 208 protrude from the outer wall 212 of the cover 204, the rollers 208 contact the work surface rather than the base wall 70 of the main body 30 or the main outer wall 52' of the bottom plate 34'. Therefore, the housing 14, 14' is protected from wear against the ground.

Figure 18:
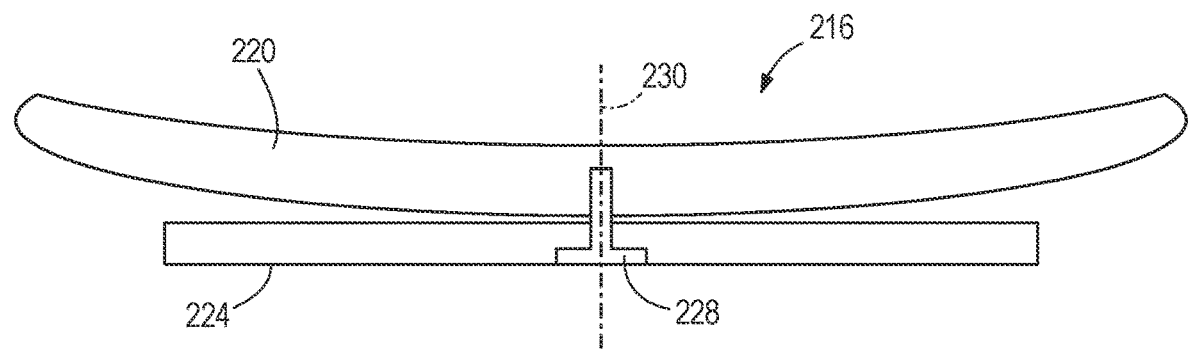
FIG. 18 is a side view of another wear attachment configured to couple to the trimmer head of FIG. 1 or the trimmer head of FIG. 8.

FIG. 18 illustrates a wear attachment 216 removably coupled to the string trimmer head 10 and/or the string trimmer head 10'. The wear attachment 216 includes a first cap 220, a second cap 224, and a fastener 228 removably coupling the first cap 220 to the second cap 224. The first cap 220 is a generally cylindrical plate or "bump cap" configured to couple to the base wall 70 of the main body 30 of the trimmer head 10 and/or the main outer wall 52' of the bottom plate 34' of the trimmer head 10'. As shown in FIG. 18, the first cap 220 is slightly curved, such that cap 220 wraps around the main body 30 and/or the bottom plate 34'.

The second cap 224 is a generally circular plate or "wear cap" configured to couple to the first cap 220. The second cap 224 is configured to contact the work surface during operation of the trimmer head 10, 10', such that the second cap 224 endures wear from the ground, rather than the trimmer head 10, 10'. The second cap 224 is removably coupled to the first cap 220, such that the second cap 224 may be replaced in the event that the second cap 224 has endured substantial damage or wear.

The second cap 224 is removably coupled to the first cap 220 via the fastener 228. More specifically, the fastener 228 prevents the second cap 224 from rotating relative to the first cap 220. The fastener 228 extends through the first cap 220 and second cap 224 along an axis 230 substantially collinear with the longitudinal axis 62, 62'. However, in alternative embodiments, the fastener 228 may be positioned at different locations and/or the wear attachment 216 may include additional fasteners. In the illustrated embodiment, the fastener 228 is a screw. However, the fastener 228 may include alternative configurations.

As the trimmer head 10, 10' is being operated, the head 10, 10' may be "bumped" against the work surface. When the head 10, 10' is bumped, the head 10, 10' rotates relative to the second cap 224. Because the second cap 224 protrudes from the first cap 220, the second cap 224 contacts the work surface rather than the base wall 70 of the main body 30 or the main outer wall 52' of the bottom plate 34'. Therefore, the housing 14, 14' is protected from wear against the ground. Additionally, after extended use and/or wear, the second cap 224 may be replaced.

Figure 19A:
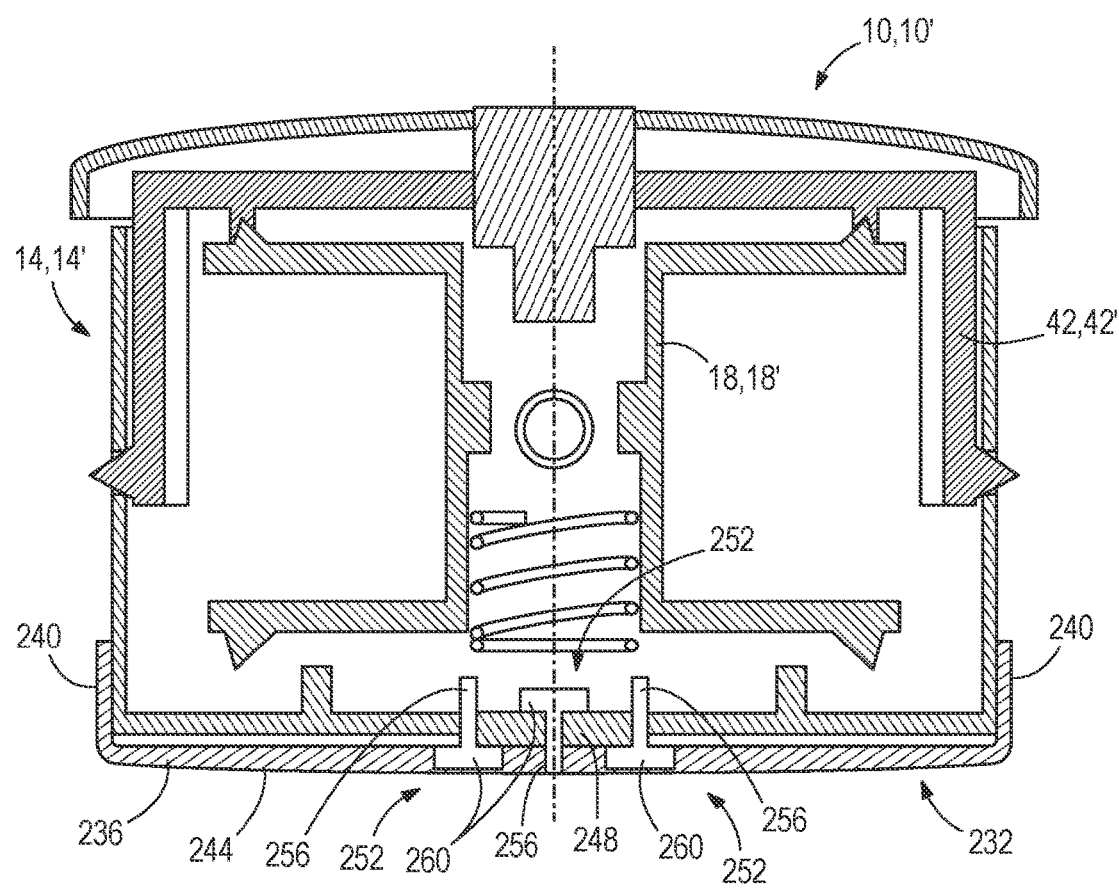
FIGS. 19A-19B are side views of another wear attachment configured to couple to the trimmer head of FIG. 1 or the trimmer head of FIG. 8.
Figure 19B:
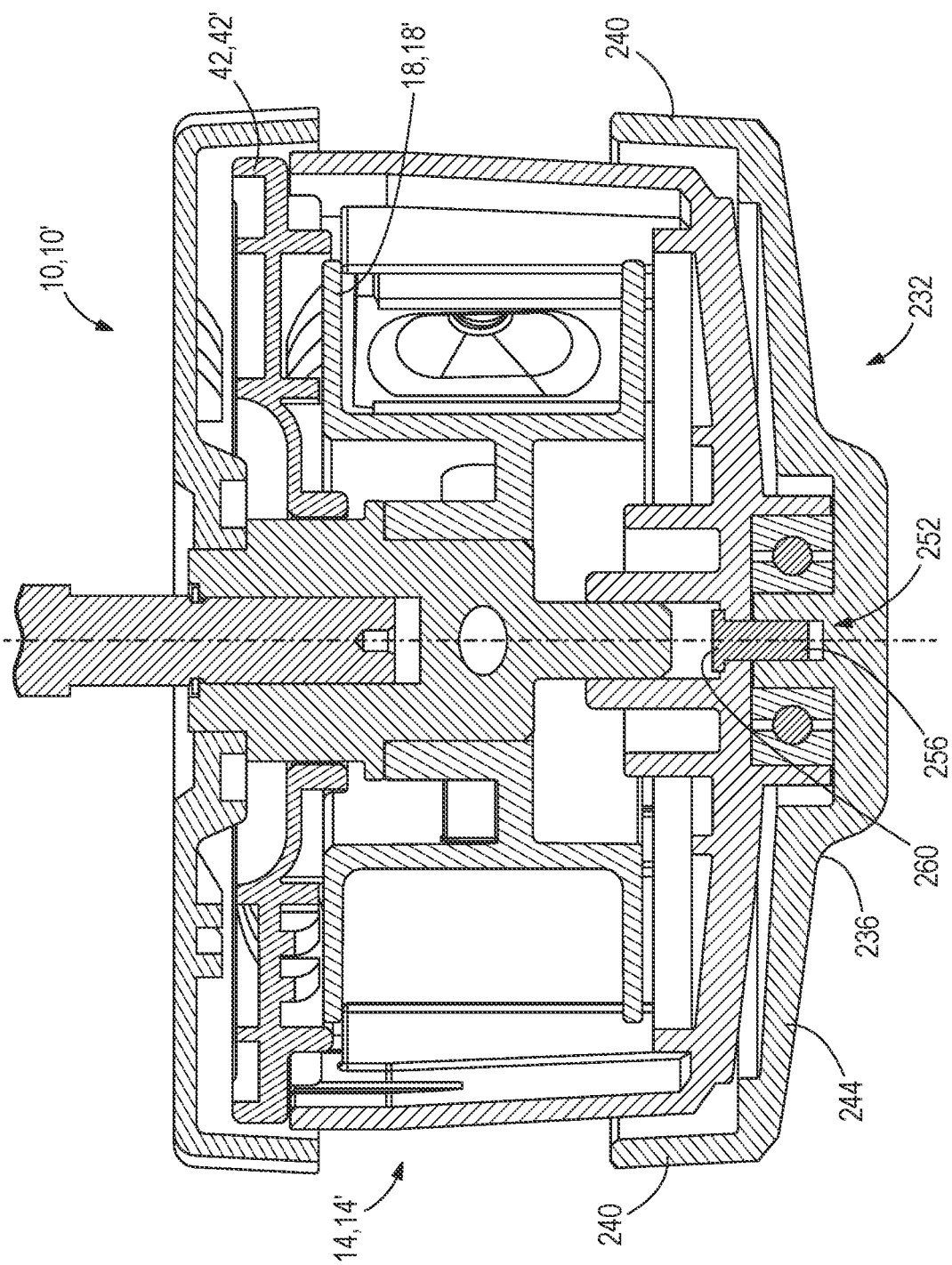

FIGS. 19A-19B illustrate a wear attachment 232 removably coupled to the string trimmer head 10 and/or the string trimmer head 10'. The wear attachment 232 includes a cap 236 coupled to the base wall 70 of the main body 30 of the trimmer head 10 and/or the main outer wall 52' of the bottom plate 34' of the trimmer head 10'. The cap 236 is generally cylindrical and includes an outer rim 240 and a main outer wall 244. The outer rim 240 of the cap 236 covers the base wall 70 and a portion of the sidewall 58 of the main body 30 and/or the main outer wall 52' and a portion of the rim 54' of the bottom plate 34'.

The cap 236 is coupled to the trimmer head 10, 10' via a bearing 248 and fasteners 252. The bearing 248 is positioned between the cap 236 and the main body 30 and/or the bottom plate 34'. The fasteners 252 extend through the cap 236 and the bearing 248, thereby securing the cap 236 to the main body 30 and/or the bottom plate 34'. In the illustrated embodiment the wear attachment 232 includes three fasteners 252. Specifically, one fastener 252 extends through the bearing 248 and the remaining two fasteners 252 are positioned on opposite ends of the bearing 248. However, in alternative embodiments, the wear attachments 232 may include fewer or additional fasteners, or the fasteners may be positioned in alternative locations. Each fastener 252 includes a screw 256 and a washer 260. However, the wear attachment 232 may include alternative types of fasteners. The fasteners 252 and the bearing 248 prevent the cap 248 from rotating relative to the trimmer head 10, 10'.

As the trimmer head 10, 10' is being operated, the head 10, 10' may be "bumped" against the work surface. When the head 10, 10' is bumped, the head 10, 10' rotates relative to the cap 236. Because the cap 236 covers the base wall 70 and/or the main outer wall 52', the cap 236 contacts the work surface rather than the main body 30 or the bottom plate 34' during a trimming operation. Additionally, because the cap 236 covers a portion of the sidewall 58 and/or a portion of the rim 54', the cap 236 contacts the work surface rather than the main body 30 or the bottom plate 34' during an edging operation (or during a trimming operation where the trimmer head 10, 10' is angled). Therefore, the housing 14, 14' is protected from wear against the ground.

Although aspects of the disclosure have been described in detail with reference to certain preferred constructions, variations and modifications exist within the scope and spirit of one or more independent aspects of the invention as described.

Various features and advantages of the invention are set forth in the following claims,

What is claimed is:

1. A trimmer head comprising:
   a housing rotatable about a rotational axis, the housing including a main body defining a cavity, and a cap removably coupled to the main body;
   a spool supported in the cavity and operable to support line to be dispensed; a retainer positioned between the housing and the spool;
   a first wear ring protruding from a base wall at a distal end of the housing, the first wear ring protruding axially outward from the base wall and opposite of the cavity; and
   a second wear ring protruding from the base wall the distal end of the housing, the second wear ring protruding axially outward from the base wall and opposite of the cavity, wherein the second wear ring is concentrically positioned relative to the first wear ring, and wherein the first and second wear rings define one or more axial maxima from the base wall and prevent damage to the housing.

2. The trimmer head of claim 1, wherein the first wear ring is rectangular.

3. The trimmer head of claim 1, wherein the first wear ring is circular.

4. The trimmer head of claim 1, further comprising a plurality of ribs protruding from the distal end of the main body, wherein the plurality of ribs are positioned between the first wear ring and the second wear ring.

5. The trimmer head of claim 1, wherein the first wear ring is positioned on the cap.

6. The trimmer head of claim 1, wherein the first wear ring is integral with the distal end of the housing.

7. The trimmer head of claim 1, wherein the first wear ring is removably coupled to the distal end of the housing.

8. The trimmer head of claim 1, wherein one of the main body and the cap includes a chamfered edge.

9. A trimmer head for use with a string trimmer including a drive shaft, the trimmer head comprising:
   a housing rotatable about a rotational axis, the housing including
      a main body defining a cavity, wherein the main body includes a sidewall, a base wall, and a chamfered edge extending between the sidewall and the base wall, and
      a cap removably coupled to the main body;
   a spool supported in the cavity and operable to support line to be dispensed, wherein the spool is drivingly coupled to the drive shaft;
   a retainer positioned between the housing and the spool;
   a first wear ring protruding from the base wall of the main body, the first wear ring protruding axially outward from the base wall and opposite of the cavity; and
   a second wear ring protruding from the base wall of the main body, the second wear ring protruding from the base wall axially outward and opposite of the cavity, wherein the second wear ring is concentrically positioned relative to the first wear ring, and wherein the first and second wear rings define one or more axial maxima from the base wall and prevent damage to the housing.

10. The trimmer head of claim 9, further comprising a plurality of ribs protruding from the base wall of the housing, wherein the plurality of ribs are positioned between the first wear ring and the second wear ring.

* * * * *